(12) United States Patent
Killoran, Jr. et al.

(10) Patent No.: US 11,968,195 B2
(45) Date of Patent: Apr. 23, 2024

(54) EMAIL-BASED AUTHENTICATION FOR SIGN IN AND SECURITY

(71) Applicant: Swoop IP Holdings LLC, Wilmington, DE (US)

(72) Inventors: John P. Killoran, Jr., Albuquerque, NM (US); Brandon Trebitowski, Albuquerque, NM (US); Isaiah Baca, Albuquerque, NM (US); Patrick Killoran, New York, NY (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 164 days.

(21) Appl. No.: 17/473,919

(22) Filed: Sep. 13, 2021

(65) Prior Publication Data

US 2022/0086133 A1 Mar. 17, 2022

Related U.S. Application Data

(60) Provisional application No. 63/077,988, filed on Sep. 14, 2020.

(51) Int. Cl.
| | |
|---|---|
| *H04L 9/40* | (2022.01) |
| *H04L 51/046* | (2022.01) |
| *H04L 67/02* | (2022.01) |

(52) U.S. Cl.
CPC ............ *H04L 63/08* (2013.01); *H04L 51/046* (2013.01); *H04L 67/02* (2013.01)

(58) Field of Classification Search
CPC ............................... H04L 63/08; H04L 67/02
See application file for complete search history.

(56) References Cited

U.S. PATENT DOCUMENTS

| | | | |
|---|---|---|---|
| 6,101,485 | A | 8/2000 | Fortenberry et al. |
| 6,167,435 | A | 12/2000 | Druckenmiller et al. |
| 8,538,845 | B2 | 9/2013 | Liberty |
| 8,606,703 | B1 | 12/2013 | Dorsey et al. |
| 8,725,635 | B2 | 5/2014 | Klein et al. |
| 8,762,272 | B1 | 6/2014 | Cozens et al. |
| 9,189,785 | B2 | 11/2015 | Liberty et al. |
| 9,208,488 | B2 | 12/2015 | Liberty |
| 9,892,386 | B2 | 2/2018 | Liberty |
| 10,395,223 | B2 | 8/2019 | Muthu et al. |
| 10,515,345 | B2 | 12/2019 | Koh et al. |
| 11,502,981 | B2 * | 11/2022 | Kassemi ................ H04L 51/08 |
| 2006/0253335 | A1 | 11/2006 | Keena et al. |
| 2007/0255620 | A1 | 11/2007 | Tumminaro et al. |
| 2009/0006233 | A1 | 1/2009 | Chemtob |
| 2010/0070419 | A1 | 3/2010 | Vadhri |
| 2012/0130898 | A1 | 5/2012 | Snyder et al. |
| 2014/0189808 | A1 * | 7/2014 | Mahaffey ................ G06F 21/31 726/4 |

(Continued)

*Primary Examiner* — Esther B. Henderson
(74) *Attorney, Agent, or Firm* — Volpe Koenig

(57) ABSTRACT

The present invention is related to systems and methods that improve the security of computer networks. These systems and methods may be utilized in various applications such as electronic commerce, secure document access, and electronic authentication. The systems and methods include methods for accessing secure accounts without the use of passwords in order to eliminate the need for passwords. In addition, systems and methods further deter automated attacks online using email authentication.

15 Claims, 29 Drawing Sheets

(56) References Cited

U.S. PATENT DOCUMENTS

| | | | | |
|---|---|---|---|---|
| 2014/0297537 A1* | 10/2014 | Kassemi | ................ | H04L 51/08 |
| | | | | 705/67 |
| 2016/0358174 A1* | 12/2016 | Kassemi | ............ | G06Q 20/3823 |
| 2018/0152471 A1* | 5/2018 | Jakobsson | ........... | H04L 63/1425 |
| 2019/0230054 A1* | 7/2019 | Kassemi | ................ | H04L 51/08 |

\* cited by examiner

Email-Based OAuth with 2 factor

Swoop Login Email-Based OAuth

Swoop Steps

EMAIL-BASED AUTHENTICATION FOR SIGN IN AND SECURITY

CROSS-REFERENCE TO RELATED APPLICATION

This application claims the benefit of U.S. Provisional Patent Application No. 63/077,988 filed Sep. 14, 2020, which is incorporated by reference as if fully set forth.

FIELD OF INVENTION

The present invention is related to improvements in security systems that may be utilized in various applications such as electronic commerce, secure document access, and electronic authentication. The systems and methods include methods for accessing secure accounts without the use of passwords in order to eliminate the need for passwords. In addition, systems and methods further deter automated attacks online using email authentication.

BACKGROUND

Online vendors are obliged to ensure customer privacy and security and therefore are required to provide their customers with password-secured accounts. These accounts are contingent on the vendor managing customer information in a secure fashion. The storage of customer passwords becomes a burdensome necessity for vendors. Furthermore, this exposes the vendor to undue security threats. A system that does not require passwords and is easier to use would be greatly welcome in the marketplace.

In addition, standard web-based logins are cumbersome and complicated to use. They require the customer to remember a password each time they wish to checkout or to log in to an account. This is a source of major frustration and inefficiency and deters repeat purchases and logins. It also creates security risks because customers engage in risky practices such as remaining logged in to their accounts. A system that offers an email-based alternative to passwords would significantly increase security and streamline the process. Additionally, a system that extends the email-based authentication by storing server-side cookies that allow for single-click authentication would be welcome in the marketplace.

Fraudulent activity is widespread throughout the Internet. Bad actors are constantly searching for weaknesses in online security systems. These players often exploit systems designed to secure single transactions by individual customers. Many utilize software applications that can perform automated transactions at a frequency far beyond the human range. Commonly known as 'bots,' these applications can overcome the online security systems by their unmitigated capacity to run transactions automatically. This can be achieved because the actions which are required of the human user can be broken down into simple steps which are easily replicated by an automated system. Hence these simple steps can be exploited by bots. A system and method that would monitor the transactions of a vendor property and react to suspicious behavior by automatically requiring questionable transactions to perform an action that is difficult for an automated system would significantly diminish bad actors from compromising the security of online accounts.

Vendors and customers constantly are looking to create barriers to the fraudulent behavior of online bots. This goal is achieved when the threatened system requires the customer to perform a task that requires a level of evaluative capacity that is beyond the limit of an automated system or bot. However, these can often be burdensome to human users. A solution that would provide a user a task that is easily performed by a human and difficult for a bot would be welcome in the marketplace.

Managers of online forms are often slow to realize their form is being attacked by a bot. Slower still is their capacity to react. In a brute force attack, the capacity to respond in an immediate and automated fashion is essential. A system that would monitor a form for unwanted actions and would automatically trigger an alert and instate an extra requirement for a user to complete a transaction would be welcomed by the marketplace. Furthermore, a system that would collect information on attackers and respond with countermeasures in a system-wide and coordinated fashion would be welcomed by vendors and customers.

Email Based login based on authentication of messages requires the customer to send and receive emails. This process can be burdensome to the customer. A system that automates the email messages authentication with a non-visible email account would streamline the authentication process.

In addition, email Based login on authentication encounters difficulties when the customer has registered with an email account that is a different account than is the default email account on their device. This results in a user's attempted login being rejected because the authentication email was sent from a different account. Accordingly, there is a need for a system and method that overcomes this limitation while maintaining the security and the efficiency of email Based login.

SUMMARY

Disclosed is a security system that allows customers to access their secure accounts without the use of a password by utilizing Simple Mail Transfer Protocol (SMTP). The SMTP standard is described in Internet Engineering Task Force (IETF)RFC 5321 and 5322, which are is incorporated by reference as if fully set forth herein.

In some instances, aspects of the inventions leverage a unique email-based form of Open Authorization (Oauth). Oath is an open standard for Internet users to grant websites or applications access to their information on other websites but without giving them the passwords. The Oauth standard is described in Internet Engineering Task Force (IETF)RFC 6749, which is incorporated by reference as if fully set forth herein. As a result, aspects of the invention allow for secure access in a single click to customer data while it also allows vendors to confirm the identity of a customer.

Additionally, aspects of the inventions allow for single-click login across multiple third-party vendors that share the disclosed system. Unlike Security Assertion Markup Language (SAML) and social sign-in providers (e.g., Google, Facebook, etc.), in embodiments of the current invention, a customer only authenticates once for all their accounts and the Authentication system 140 reports on that status to the third parties. There is no customer account to maintain. This is in contrast to the social sign-in providers, where if a customer is logged out of those platforms, the customer is required to log in to those accounts if they wish to access the third party. As a result, embodiments of the invention allow for shared authentication status with multiple third parties means fewer initial authentication procedures; even if the customer logs out of their email client, the customer can access these sites, and no passwords are ever required to access the third party sites. This fulfills CAPTCHA requirements without the need for a customer to respond to a challenge. Additional security where a customer could universally lock all their accounts or place additional requirements on specific third-party accounts.

Additional aspects of the inventions protect customer accounts and vendor systems by leveraging email authentication to deter fraudulent login attempts and scaled automated attacks. Various forms of email authentication are used to confirm a customer's identity in order to thwart fraudulent attempts to access private servers. It exploits the ease of use of email to filter out automated systems from completing transactions. These attacks may be by individual users or more complex automated attacks. The disclosed system also is designed to take action against bad actors who continue fraudulent behavior. Embodiments of the present invention increase customer and vendor security against scaled automated attacks using email authentication.

Further aspects of the inventions increase security that utilizes a non-visible email address or series of addresses associated with a customer. The sending and receiving of email messages may be used in an automated fashion without the need for customers to take direct action.

Additional embodiments may provide for multiple types of email authentication. One form is where a login link is sent to the email address of the customer and when the link is selected, access is granted (Swoop's Magic Link). The other option is where the customer sends an email to the e-commerce system, and the email is authenticated, and access is granted (Magic Message Magic Address). The customer can have the option of either method. The customer may be emailed a code to gain access (Magic Code), or an additional factor might be added, such as requiring a secret PIN. The multiple format options make the process more versatile, reduces friction, and increases security. Other formats of messaging may be substituted, such as social media or SMS. Blockchain may be utilized to secure authentication and transaction information. Furthermore, this form of authentication then allows for a Single click Authorization (1 Click Authorization). This offers the customer and vendor a solution that does not require a password and fulfills CAPTCHA requirements. After an initial email-based authorization by the e-commerce system, the customer may be able to 1-click authorize on future logins.

BRIEF DESCRIPTION OF THE DRAWINGS

A more detailed understanding may be had from the following description, given by way of example in conjunction with the accompanying drawings wherein.

DETAILED DESCRIPTION

All embodiments described below may be used in tandem or in relation to specific vendor needs. Aspects of the of the present invention utilize email authentication to increase security and provide greater ease of use. As a result, embodiments of the invention do not require the use of a password to secure private information and secure customer data by the authentication of their email messages and confirming the customer's identity.

Figure 1:
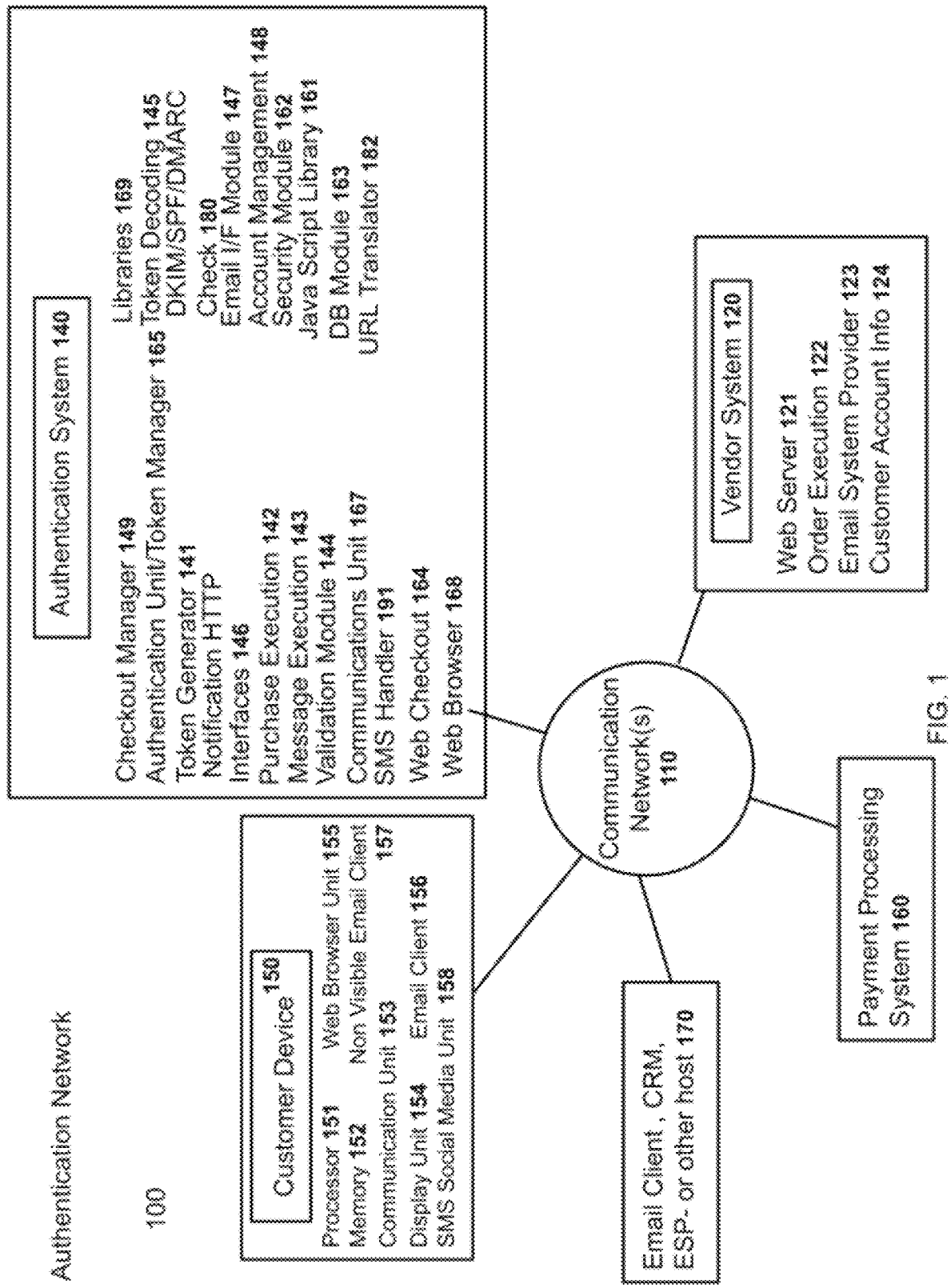
FIG. 1 illustrates a system diagram of an email based Authentication Network that facilitates email-based authentication for sign in and security.

As shown in FIG. 1, the disclosed methods provide different benefits based on the dynamic nature of the e-commerce system. The security network offers vendors multiple methods to validate a message based on authenticating identifiers and tokens and the categorization of these emails into registered and unregistered customers.

The embodiments described below may also be integrated with an email service provider, customer relationship management, or directly with a payment processor. Payment processing may occur in any number of ways using multiple gateways, banks, credit cards, debit cards, gift cards, direct carrier billing, automatic clearinghouses, or virtual currency. Although the description below focuses on the use of email, Short Message Service (SMS) and social media networks may also be used. Although some examples and discussion herein generally use SMS, other texting formats may be substituted for SMS, including Extensible Markup Language (XMPP), Session Initiation Protocol (SIP), Voice over Internet Protocol (VoIP), multimedia messaging service (MMS), Messaging Queuing Telemetry Transport (MQTT), and Apple Push Notification Service (APNS) used in services such as Whatsapp, Viber, Facebook Messenger, iMessage, and other forms Internet Telephony Protocols. The configuration of the system may vary accordingly.

A security network 100 that facilitates transactions between a customer device 150 and a vendor 120 utilizing an Authentication system, 140 is disclosed. A method and apparatus allow the Authentication system 140, such as an Email Payment Gateway, to enable customers to log in to secure accounts via a series of messages authenticated in different media. The example security network 100 shown in FIG. 1 may be used for e-commerce transactions, secure document exchange, or restricting access to files or web pages. The example Security Network 100 includes a vendor system 120, an Authentication system 140, a customer device 150, a banking server (not shown), an email service provider 170, and a payment processing system 160 160 that may communicate over one or more wired and/or wireless communication network 110. The wired or wireless communication network 110 may be public, private, or a combination of public or private networks.

The customer device 150 may be, for example, a cellular phone, a smartphone, a desktop computer, a laptop computer, a tablet computer, or any other appropriate computing device. The customer device 150 may utilize short message service (SMS) messages, multimedia messaging service (MMS), social media apps, web browsing, and or email. For example, social media apps may include Facebook, Twitter, Google Plus+, LinkedIn, Instagram, Pinterest, Snapchat, Tumblr, and the like. The customer device 150 includes a processor 151, memory 152, a communications unit 153, a display unit 154, a web browser unit 155, which may communicate data to/from the webserver module(s) in the vendor server 120 and payment server 140, email client 156, an SMS social media unit 158 and a messaging unit 159. The web browser unit 155 may include and/or communicate with one or more sub-modules that perform functions such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet-based communications. The web browser unit 155 may implement RIA and/or multimedia technologies using one or web browser plug-in modules (e.g., ADOBE FLASH) and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone, or a touch screen, and provide data that indicates the input to the web browser unit 155.

The vendor system 120 may include a web server 121, order execution unit 122, an email system provider 123, and customer account info 124. The vendor system may be substituted for a financial management system, as illustrated in the examples described herein.

The web server 121 provides a website that may be accessed by a customer device 150. The web server 121 may implement HTTP protocol and may communicate Hypertext Markup Language (HTML) pages and related data from the website to/from the customer device 150 using HTTP. The vendor server 120 may be connected to one or more private or public networks (such as the Internet), via which the webserver 121 communicates with devices such as the customer device 150. The web server 121 may generate one or more web pages, may communicate the web pages to the customer device 150, and may receive responsive information from the customer device 150.

The web server 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The vendor system 120 may also include one or more additional components or modules (not depicted), such as one or more load balancers, firewall devices, routers, switches, and devices that handle power backup and data redundancy.

The order execution unit 122 is configured to receive instructions included in received messages and executes orders on behalf of the vendor system 130.

The memory may be configured to store information associated with e-commerce transactions. This may include inventory information, information used to generate web pages, customer information, and other e-commerce data.

The Authentication system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, DKIM/SPF/DMARC check 180, a Universal Resource Locator (URL) translator 181, and a manager unit 166. While only one vendor system 120 is shown communicating with the Authentication system 140, this is shown as an example only. The Authentication system 140 may communicate with an internal or external email service provider (ESP) 170 and an internal or external payment processing system 160. The Authentication system 140 may communicate with multiple vendor systems 120.

Similarly, vendors may register with the Authentication system 140. The Authentication system 140 may provide the vendor system 120 with a public key and private key to be used in the token transaction in accordance with the methods described herein. When a transaction is attempted (e.g., for invoices and payments), the Authentication system 140 decodes the token, authenticates the sender of the email, which may allow the transaction to be processed. While the Authentication system 140 is depicted as a separate entity in FIG. 1, this is shown as an example only. The Authentication system 140 may be controlled and/or co-located with the vendor system 130 and/or the email service provider 170.

The token generator 141 may generate tokens for use in e-commerce transactions. Tokens may be encrypted or plain text strings that contain information to perform a transaction when sent to the Authentication system 140. A token may be one or multiple encrypted strings, files, passwords, ciphers, plain text, or other data which may contain information used to perform or authenticate a transaction. While FIG. 1 shows the token generator 141 as being a part of the Authentication system 140, it may be hosted by any trusted party with access to the private key. For example, the banking server may include a token generator 141. A token may include one or more of the following parameters or other parameters not listed below:

Private-key: The private key provided by the Authentication system 140.

Public-key: E-commerce system's 140 public key, provided by the Authentication system 140.

Auth-key: Any additional data that may be used to authenticate the transaction, including, but not limited to, biometric identification, location data, and other fraud detection systems.

Partner-id: The partner ID given provided by the Authentication system 140.

Environment: The environment the vendor wants to generate buttons for. This distinguishes whether the token is being used in a testing environment or in the live environment (and running real transactions).

Type: The type of token to generate (e.g., bulk, email-targeted, etc.). There are multiple types of tokens that a token generator 141 may generate and decode. For example, site tokens may be used for website transactions, email tokens for minimum-of-clicks email payments, and universal tokens for email validations.

Card: The card token associated with the recipient of this token. When a customer is registered with the Authentication system 140, the vendor receives a credit card token—a unique identifier that references the specific card associated with that customer and vendor. When the vendor is generating a token to submit to Authentication system 140, they may include the card token as a customer identifier.

Email: The email associated with the receipt of this token. In some instances, more than one email address may be included in the token. This allows for more than one email address to be associated with a customer. For example, a customer may link both their personal and work email addresses. In this manner, if the response email is sent from either their personal or work email addresses the token will be able to properly authenticate the user.

URL: The Signup URL, the recipient, may go to if the customer doesn't have payment information registered with Authentication system 140.

Amount: The amount a customer should be charged for the transaction the token is generated for.

User-data: Data to pass back as a reference. This data may include custom data that the vendor may want to pass through the Authentication system 140 and receive back when a transaction has been completed. It may include an item reference number or SKU, customer address, or other pieces of data that are not required by Authentication system 140 to complete a transaction but that the vendor wants to be associated with that transaction.

Expires: Expiration date for a token and represents an integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request—typically the identifier of the web browser unit that is requesting the content.

Header-accept-language: The HTTP_ACCEPT_LANGUAGE from the request header. The accept-language is the acceptable language for the response—e.g., the language in which the web browser unit is requesting the content be sent back.

Header-accept-charset: The HTTP_ACCEPT_CHARSET from the request header. The accept-charset is the character sets that are acceptable for the response—e.g., the character set in which the web browser unit is requesting the content be sent back.

IP address: The IP address of the token recipient.

Email Type: Whether the token is for use with mail to links, copy and paste or PIN authentications;

Device Type: Whether the email is sent from a mobile phone or a computer. In some instances, it may also indicate the operating system and other information about the hardware;

Email Client: An indication of what type of email client will send the email. For example, this token could indicate that the email will be sent from Microsoft Outlook or GMAIL.

In one example, a bulk token may omit the card and email fields, thereby allowing for the tokens to be shared. Additionally, or alternatively, a bulk token may include the card field and/or email field, but the Authentication system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g., request for the purchase of goods.) If the token decoder 145 indicates the token is valid, the message execution module 143 may then access the account management unit 148 to verify a transaction.

The database module 163 serves as a database to store information that may be accessed by the Authentication system 140.

The token decoder 145 may be configured to decode tokens received from external sources, such as a vendor system 120 or a customer device 150.

The validation module 144 may serve to authenticate received emails using the DomainKeys Identified Mail (DKIM) and/or Sender Policy Framework (SPF) protocols. For example, SPF allows a domain owner to add a file or record on the server that the recipient server cross-checks. SPF is described in Internet Engineering Task Force (IETF) RFC 7208, which is herein incorporated by reference.

Similarly, DKIM may be used to embed information within the email. DKIM is described in Internet Engineering Task Force (IETF) RFC 6376, which is incorporated by reference as if fully set forth herein.

Likewise, Domain-based Message Authentication, Reporting, and Conformance (DMARC) is a mechanism by which a mail-originating organization can express domain-level policies and preferences for message validation. DMARC is described in Internet Engineering Task Force (IETF) RFC 7489, which is incorporated by reference as if fully set forth herein.

While these specific validation/authentication protocols are discussed herein, any known validation/authentication protocol may be used, and the use of the DKIM, SPF, and DMARC protocols are used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send an email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address might be generated. If the server accepts the sender and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL, and FastMail. Any mail from these organizations should carry a DKIM signature.

More specifically, both signing and verifying modules are usually part of a mail transfer agent (MTA). The signing organization may be a direct handler of the message, such as the author, the originating sending site, or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported email's header and body—, not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of email as well as senders, and "DKIM awareness" is programmed into some email software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; l=1234; t=1117574938; x=1118006938;
h=from:to:subject:date:keywords:keywords;
h=MTIzNDU2Nzg5MDEyMzQ1Njc4OTAxMjMON-TY3ODkwMTI=;
b=dzdVyOfAKCdLXdJOc9G2q8LoXSlEniSbav+ yuU4zGeeruD00lszZ VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is it's expire time, and
h is the list of signed header fields, repeated for fields that occur multiple times.

The DKIM-signature header field itself is always implicitly included in h.

The data returned from the verifier query is also a list of tag-value pairs. It includes the domain's public key, along with other key usage tokens and flags. The receiver may use this to then decrypt the hash value in the header field and, at the same time, recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message or adding an Authentication-Results header field to the message as described in RFC 7001, which is incorporated as if fully set forth.

While DKIM, SPF, and DMARC protocols are discussed herein, validation module 144 may perform any authentication and validation type protocols. DKIM, SPF, and DMARC are used to provide examples of such validation protocols that may be performed in validation module 144.

The notification HTTP module 146 delivers notices of events to external systems, such as an HTTP endpoint the vendor configures to update their internal database when a transaction is executed.

An email interface module 147 may be configured to parse emails for action by the Authentication system 140.

The account management unit 148 is configured to manage accounts registered with the Authentication system 140. A customer or vendor wishing to complete a transaction with an Authentication system 140 may register his/her email address and payment information with the Authentication system 140. The account management unit 148 may be configured to store a customer registry and a vendor registry.

The security module 162 may be configured to perform additional security measures to prevent unauthorized access to the system or fraud.

The email service provider 170 may be associated with the vendor system 120, the Authentication system 140, or may be a third-party entity. The email service provider 170 may be configured to provide email marketing services. The email service provider 170 may further be configured to provide tracking information showing the status of emails sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the Authentication system 140. The templates may be used for sending information to contacts. Email service provider 170 may include a customer interface that allows a customer to adjust the template, or it may be integrated with external sources (e.g., vendor system 120 or Authentication system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third-party system bank. The Authentication system 140 may communicate with the banking server to verify that the customer has adequate funds or credit for the requested payment. For example, the banking server may be controlled by VISA, AMERICAN EXPRESS, MASTERCARD, or any other banking or financial network that a customer may use for online payment. The banking server may be an automatic clearing house service (ACS). The banking server may be an interface for a centralized or decentralized virtual currency system or protocol such as frequent flyer miles, "reward" points, or Bitcoin.

The email-based Authentication system 140 may allow vendors to send advertising emails or bills with a mailto link associated with a specific product offer (or payment amount) and select the mailto link and generate a response email by selecting the mailto link. This response email contains a token and is addressed to the Authentication system 140. Once sent, this response email confirms the customer's payment for the product (or prepayment of a bill) by parsing the information in the token. The Authentication system 140 processes the payment and notifies the vendor system 120 and the customer device 150. The Authentication system 140 may comprise a token generator 141 as well as components for processing the tokens and components for processing the payments, and a system for notifying the vendor system 120 of the transaction details. In addition, the Authentication System 140

The functionality of the offer, mailto link, and response email is described in U.S. Pat. No. 9,152,980, which was issued on Oct. 6, 2015, entitled EMAIL-BASED E-COMMERCE, which is a continuation of U.S. Pat. No. 8,775,623, which was issued on Jul. 8, 2014, entitled SYSTEM AND METHOD FOR EMAIL-BASED E-COMMERCE, and U.S. Pat. No. 9,058,591 which issued on Jun. 16, 2015, entitled EMAIL-BASED DONATIONS, which applications are incorporated by reference as if fully set forth.

Referring back to the example system in FIG. 1, the payment processing system 160 may be an independent third-party operated unit; it may be located in the Authentication system 140 or the vendor system 120.

While the example system shown in FIG. 1 shows the Authentication system 140 comprising the token generator 141, this is shown as an example only. The vendor system 120 may also include a token generator 141 that allows vendors to create tokens directly. In another example, a third party may have a token generator 141 to create tokens for use by the vendor system 120.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein. The mailto link may be accessed with a corresponding short URL.

The Authentication system 140 may include a database of registered customers, such as for payment processing. The Authentication system 140 may identify a customer by their email address and may decode tokens included in the content of an email and process transactions based on the data in the token. A vendor that is associated with the Authentication system 140 may send emails with the tokens generated for processing by the Authentication system 140. When generating tokens, a related URL checkout page with a matching offer is generated. This allows vendors via vendor system 120 to send emails with payment options, including payments for product offers, donations, services, and gift cards, for example, with each offer associated with a token and a URL checkout page. The token is associated with a mailto link. A customer may activate the mailto link by selecting (or "clicking on") the link and send the message to the Authentication system 140. The Authentication system 140 may then identify the email address and decode the token. If the Authentication system 140 determines that the email address is not registered in the database, the Authentication system 140 sends an email back to the customer with a URL link that is a link for registration. This registration is prepopulated based on the customer's mailto link selection based on the content of the token. The URL captures the customer's information and registry information. The Authentication system 140 updates the database once the new customer is registered. In future transactions, the email address of the customer is identified as registered by the Authentication system 140.

A Security Network 100, as described herein, allows an email payment opportunity. This may include an email advertisement offering a product or service which is sent to customers and contains one or more mailto links. Each mailto link may relate to an item (e.g., service or product). If the mailto link is selected by a customer, an email message associated with an item or items is generated. Within that generated email message is a token that includes encoded information such as the purchase amount, the merchant, or an item identifier. The information contained in the token includes details for both the completion of an email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g., a response email in the case of product unavailability). This mailto link may be generated by a vendor through a web interface tool or by using the e-commerce Security Network 100 to programmatically create either the token or the full mailto link.

For a customer to complete an email transaction, the customer's payment information may be contained in the email e-commerce system database 163. In order to determine if the customer's payment information is in database 163, the token may be decoded to recognize the customer when the email arrives at the Authentication system 140. The vendor sends the first email via the vendor system 120. The customer via customer device 150 responds by activating a mailto link by sending the response to the Authentication system 140. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plug-in, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the Authentication system 140. If the validation resource returns a "fail" condition for any data on the form, error messages may be displayed to the customer to enable correction of the one or more particular inputs that were identified as incorrect and resubmission again.

These remote resources may be created to describe standard information that may be used across numerous merchants, or they may be used to define custom information that may be used for a single merchant.

Using this Security Network 100, a vendor via vendor system 120 may not be required to expend additional computer programming effort because it relies on the email Authentication system 140. If the offer web page is linked to the email purchase opportunity, the vendor may not be required to modify any existing systems or processes to register customers with the email Authentication system 140. The vendor may not need to segment their email lists into registered and unregistered customers, and the customers are not aware of the distinction within the content of the email. The distinction between customers occurs by virtue of the system, relieving both the vendor and the customer of any excess choices or distinctions. The vendor may create offers manually via a web interface, and the email Authentication system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This Security Network 100 provides a vendor with a more automated or customized way of handling elements that may be achieved through the use of the email Authentication system 140.

The disclosed methods provide different benefits based on the dynamic nature of the Authentication system 140. The Authentication system 140 offers vendors 120 multiple methods to hold and transfer funds via email, SMS, or social media message. The Authentication system 140 also offers a flexible configuration of the system allowing the vendor 120 or other third parties to hold desired parts of the system in the vendor system 120. For example, the token generation which is depicted in FIG. 1 as being held by the Authentication system 140 may be held by another party. When the vendor 120 registers with the Authentication system 140, they may be offered different levels of service, and the vendor 120 may choose the configuration required.

Figure 2:
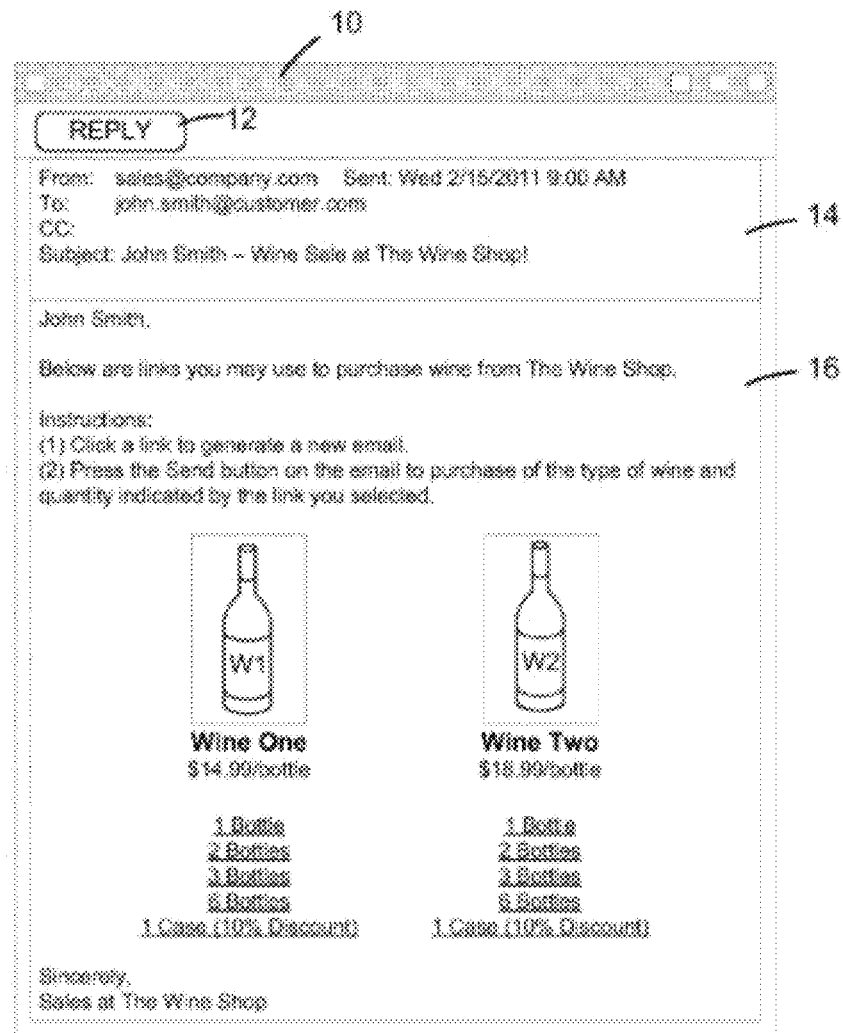
FIG. 2 illustrates an example email message that solicits the purchase of goods from a vendor.

FIG. 2 illustrates an example email message that solicits the purchase of goods from a vendor. FIG. 2 shows an email display window 10 that may be used by the email client module of customer device 150 to display the first example email message from the message processing module. The email display window 10 may include a reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the Authentication system 140 for the communication of email messages. Further to this example, the control area 14 shows that the email address of the example recipient of the message (John Smith) is "john.smith@customer.com." The control area 14 may also display information such as the subject of the email message and the time the email message was sent. The reply button 12 may respond to user input to generate a new display element (not depicted) to respond to the email message.

The message body area 16 may display the body of the email message. As shown in FIG. 2, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate formats, and each may describe a new email message that may be generated by the email client module of customer device 150 when that link is selected.

The "1 Bottle" link beneath the picture of the Wine One bottle may include information that, if selected, generates an email message that, if received by the Authentication system 140, will indicate to the Authentication system 140 that John Smith may like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the Authentication system 140, and that includes a message body that includes the identifier for John Smith ("0777"), an identifier of the selected product ("0005"), and an identifier of the quantity that John Smith may like to order (in this example, a single bottle). Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the Authentication system 140, will indicate to the Authentication system 140 that John Smith may like to purchase two bottles of Wine One. According to this example, the "2 Bottles" link may be defined as follows:
<a href="mailto:sales@company.com?subject=Purchase percent 20from percent 20Wine percent 20Shop percent 20 and body=You percent 20have percent 20created percent 20an percent 20order percent 20for percent 20two percent 20bottles percent 20of percent 20Wine percent 20One. percent 20Press percent 20the percent 20Send percent 20button percent 20to percent 20complete percent 20the percent 20order. percent OA percent OAProductID0005 percent 20QualifierNA percent 20Qty0002 percent 20CustomerID0777 percent 20CampaignID0003" target="_blank">2Bottles</a> mailto:sales@company.com?Subject="Press send to pay $42.99 to Wine Shop"? body="TEXT XXX-XXX-XXX-XXX"

In addition, the token identifier may be part of the To: address, or any other portion of an address field, or the address field itself. This token may be, for example, of the form: ex: mailto:payment-id-XXX-XXX-XXX@payments.atpay.com?Subject="Press send to pay $42.99 to Wine Shop"?body="TEXT". Once this token identifier reaches the Authentication system 140, the Authentication system 140 may perform a lookup of the actual token in order to parse the offer details. This process is described in greater detail below.

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module of customer device 150 may receive a user input that indicates that one of the links displayed in the message body area 16 is selected. The user input may be, for example, a mouse click, keyboard input, or any other type of input that indicates that a link is selected. The email client module of customer device 150 may, in response to this user input, generate and display an order email message as specified by the selected link.

Figure 3:
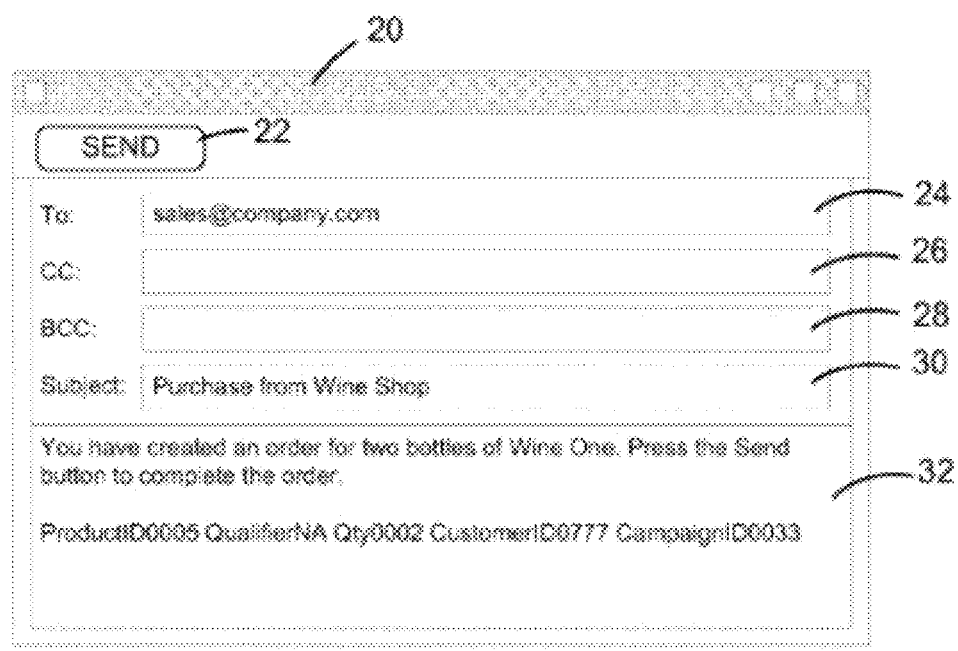
FIG. 3 illustrates an email message for placing an order.

FIG. 3 illustrates an email message for placing an order. FIG. 3 shows an example message composition window 20 that may be displayed in response to a selection of a link from the message body area 16 of the email display window 10 of FIG. 2. The message composition window 20 of FIG. 3 may include a Send button 22, a To area 24, a CC area 26, a BCC area 28, a Subject area 30, and a message body area 32. The Send button 22 in the message composition window 20 of FIG. 3 may be responsive to input from a user, such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message.

FIG. 3 shows an example wherein the "2 Bottles" link beneath the picture of the Wine One and described above with reference to FIG. 2 is selected. The To area 24 indicates that the message is addressed to sales@company.com. The Subject area 30 indicates that the subject of the message is "Purchase from Wine Shop." The CC area 26 and BCC area 28 are blank. Continuing the example of FIG. 3, Wine One product has a product identifier of "0005" and John Smith has a customer identifier of "0777." Accordingly, the message body area 32 includes the text "ProductID0005" and "CustomerID0777." To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 2 is selected, the display areas 24, 26, 28, 30, 32 in the message composition window 20 may include contents specified by the selected different link. For example, in an instance where a link related to Wine Two is selected, the message body area may not include the text "ProductID0005," but may include text that indicates the corresponding identifier for Wine Two.

Figure 4:
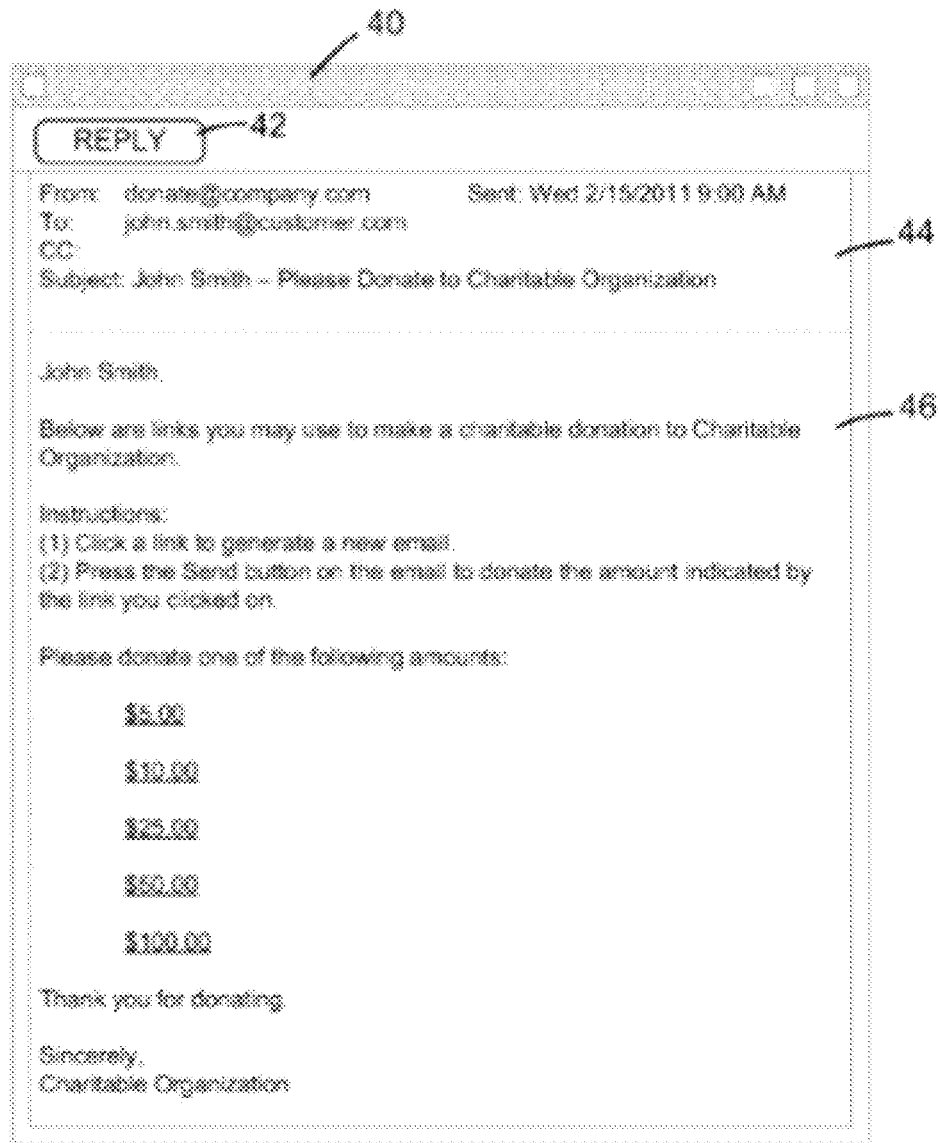
FIG. 4 illustrates an advertisement email message that solicits a donation.

FIG. 4 illustrates an advertisement email message that solicits a donation. FIG. 4 shows an email display window 40 that may be used by the email client module of customer device 150 to display a second example email message from the message processing module. The email display window 40 includes a Reply button 42, a control area 44, and a message body area 46. These display areas 42, 44, 46 may possess similar and/or analogous characteristics and/or perform similar functionality as corresponding display areas 12, 14, 16 in the message composition window 20 of FIG. 2. According to the example of FIG. 4, the control area 44 shows that the sender of the message has the email address "donate@company.com." This is an email address that may be associated with an account used by the Authentication system 140 for the communication of email messages. Further to this example, the control area 44 shows that the email address of the example recipient of the message (John Smith) is "john.smith@customer.com."

As shown in FIG. 4, the message body area 46 of the email display window 40 may display an example email message that shows information related the solicitation of donations, for example, a non-profit organization ("Charitable Organization"). The message body area 46 also includes mailto links, such as the "$5.00," "$10.00," "$25.00," "$50.00," and "$100.00" links. These links may possess similar and/or analogous characteristics and/or include similar and/or analogous information, as the mailto links described above with reference to FIG. 2. The "$5.00" link describes an email message that, if received by the Authentication system 140, will indicate to the Authentication system 140 that John Smith may like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module of customer device 150 may receive a user input that indicates that one of the links displayed in the message body area 46 is selected. The email client module of customer device 150 may, in response to this user input, generate and display an order email message as specified by the selected link.

Figure 5:
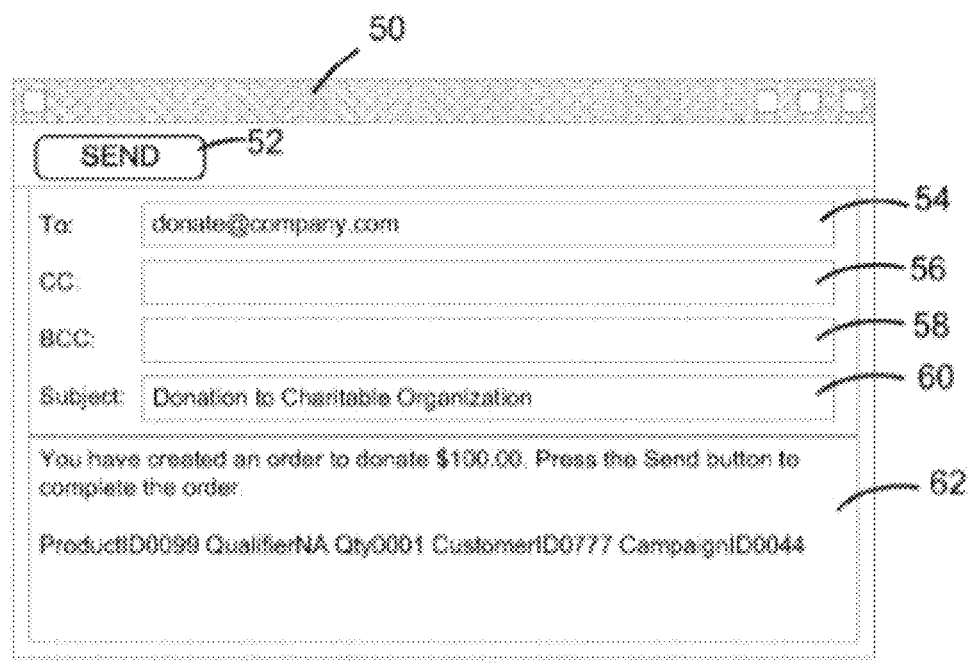
FIG. 5 illustrates an email message for ordering a donation.

FIG. 5 illustrates an email message for ordering a donation. FIG. 5 shows an example message composition window 50 that may be displayed in response to a selection of a link from the message body area 46 of the email display window 40 of FIG. 3. The message composition window 50 of FIG. 5 may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display areas 22, 24, 26, 28, 30, 32 in the message composition window 20 of FIG. 3.

FIG. 5 shows an example wherein the "$100.00" link from the message body area 46 of the email display window 40 of FIG. 4 is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044," indicating that the order is associated with an email campaign with an identifier of "0044."

The email client module of customer device 150 may send the generated order email message to the Authentication system 140. This may be performed in response to input from a user of the customer device 150. As one example, the email client module of customer device 150 may, in response to a selection of the Send button 52 in the message composition window 50 of FIG. 5, transmit an order email message based on the contents of the fields 54, 56, 58, 60, 62 in the message composition window 50. As another example, the email client module of customer device 150 may, in response to a selection of the Send button 52 in the message composition window 50 of FIG. 5, transmit an order email message based on the contents of the display areas 54, 56, 58, 60, 62 in the message composition window 50.

A token may be located within the To: Cc: or Bcc fields of a response email. This token may take the form of a short token, for example. The Authentication system 140 may generate the short token that is located in the To: field, or any other field, for example, as part of the email address. When the vendor system 130 requests that the token generator 141 generate a mailto link with the identifiers and token, the token generator 141 may generate a "short lookup token" and the "long token" encoded with the identifiers. The short lookup token may be associated with the long token and may be required or otherwise needed to access the information in the long token index. The short token index may be sent in an email to the customer device 150 as a mailto link. The customer using the customer device 150 selects the mailto link and generates the response email addressed to the Authentication system 140. The short lookup token may be built into the address of the response email. The short lookup token may be of the form:
payment-id-74E4DE00-51E2-457B-8C0B-648640EF232D@payments.atpay.com, for example.

When the customer using customer device 150 sends the email and the Authentication system 140 receives the email and authenticates the customer's email address, the Authentication system 140 may also determine using the short lookup token included in the email address of the Authentication system 140 the long token associated therewith. When the long token is determined, the Authentication system 140 decodes the long token and processes the payment. The use of the short token allows for a less convoluted field in the email address and eliminates the need for the token to be located in the body field.

The short token lookup is not necessarily required in this system, as the transactions may be processed with the long token either in the address field, another field, or in the body of the response email. The use of the short lookup token may lessen the one-to-one correlation between the token and the actual offer and/or transaction details, as that correlation may be more direct in the long token embodiment.

Figure 6:
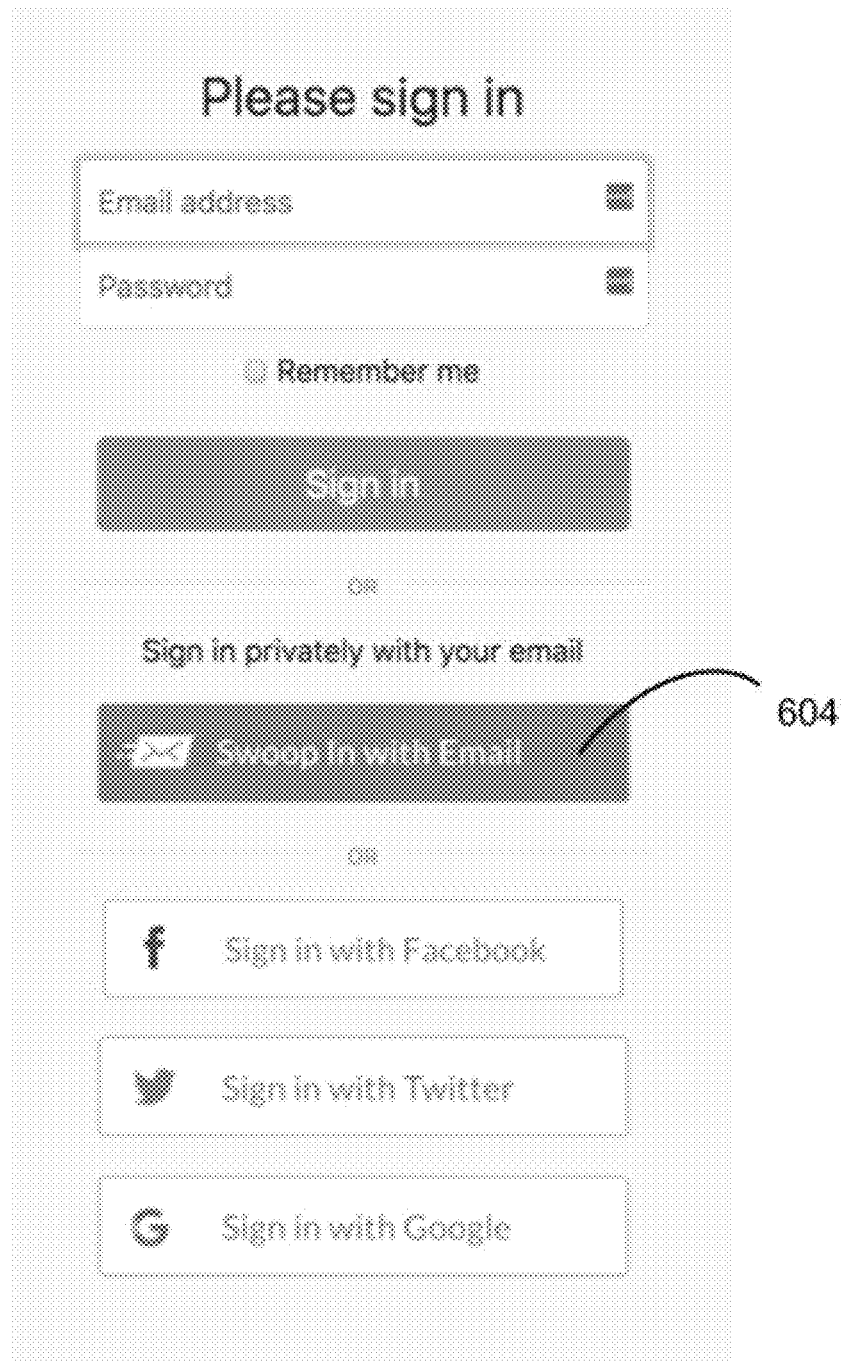
FIG. 6 is a diagram illustrating a signup process that collects various information required for multiple fail safe confirmations.

FIG. 6 is an example of a user interface that may be utilized with embodiments of the invention. For example, the user may click Login Button 604 to trigger the authentication processes described herein.

Figure 7:
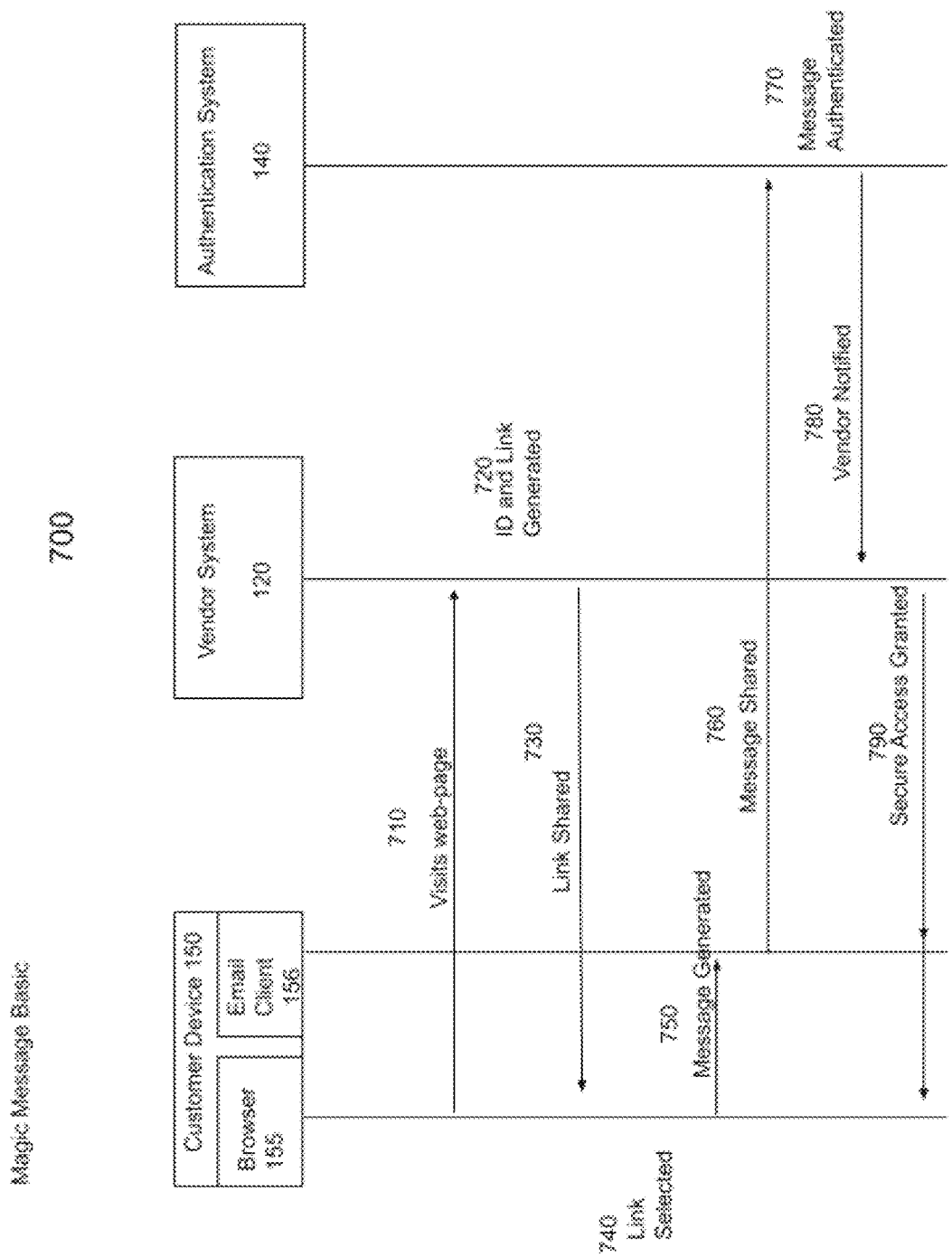
FIG. 7 is a transactional flow diagram illustrating an embodiment that authenticates a message.
Figure 10:
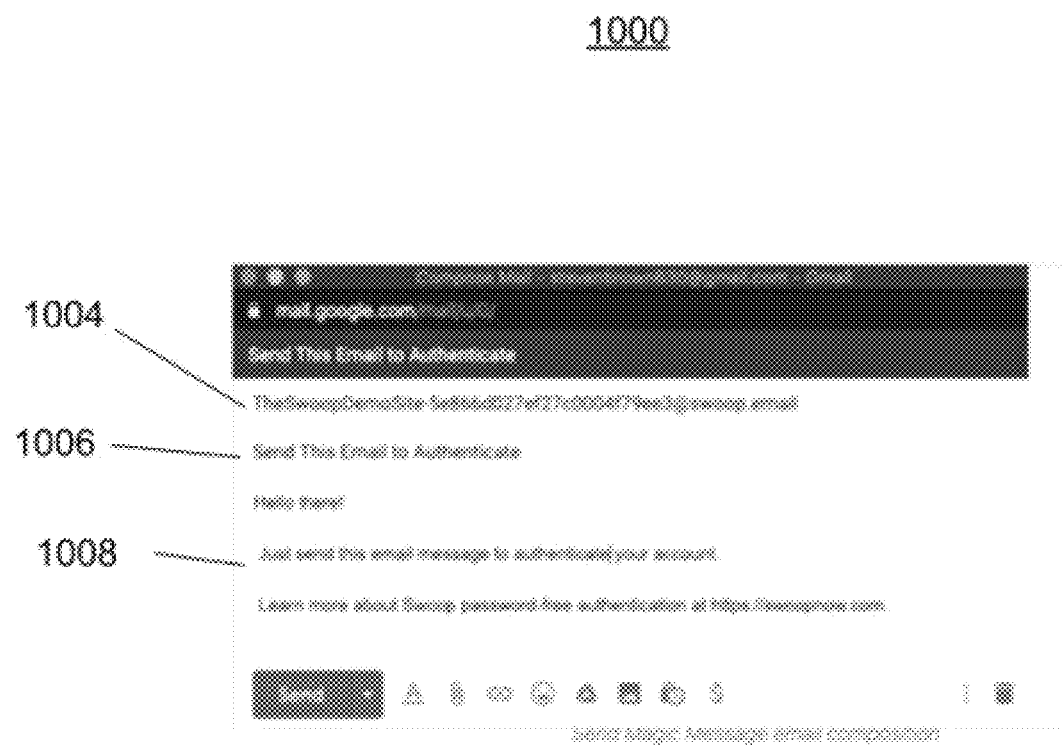
FIG. 10 is an example of an email that is sent in the authentication process.

FIG. 7 is a transactional flow diagram 700 illustrating the process of a customer accessing a secure account without the use of a password. A customer using the customer device may access a web page via a web browser. The web page may be a sign-in, login, or payment page, among other possible secure transactions—the customer using the customer device 150 visits the vendor site or web page at step 710. Then the vendor or third-party generates a mailto link with at least one identifier at step 720. URLs that generate email messages may be substituted for mailto links. The vendor shares the link and identifier with browser 155 at step 730. The customer selects the mailto link or equivalent link and requests a secure sign-in, login, or payment option at step 740. The selection of the link at step opens the email client and generates an email response message addressed to the authentication system 140 with at least one identifier. (an example of a response email is depicted in FIG. 10) The identifier may be anywhere in the message. The identifier may be integrated into the email address 1004. The customer shares the email message and identifier with the authentication system 140 at step 760. The authentication system 140 receives the email, processes the identifier, and authenticates the message at step 770.

Figure 15:
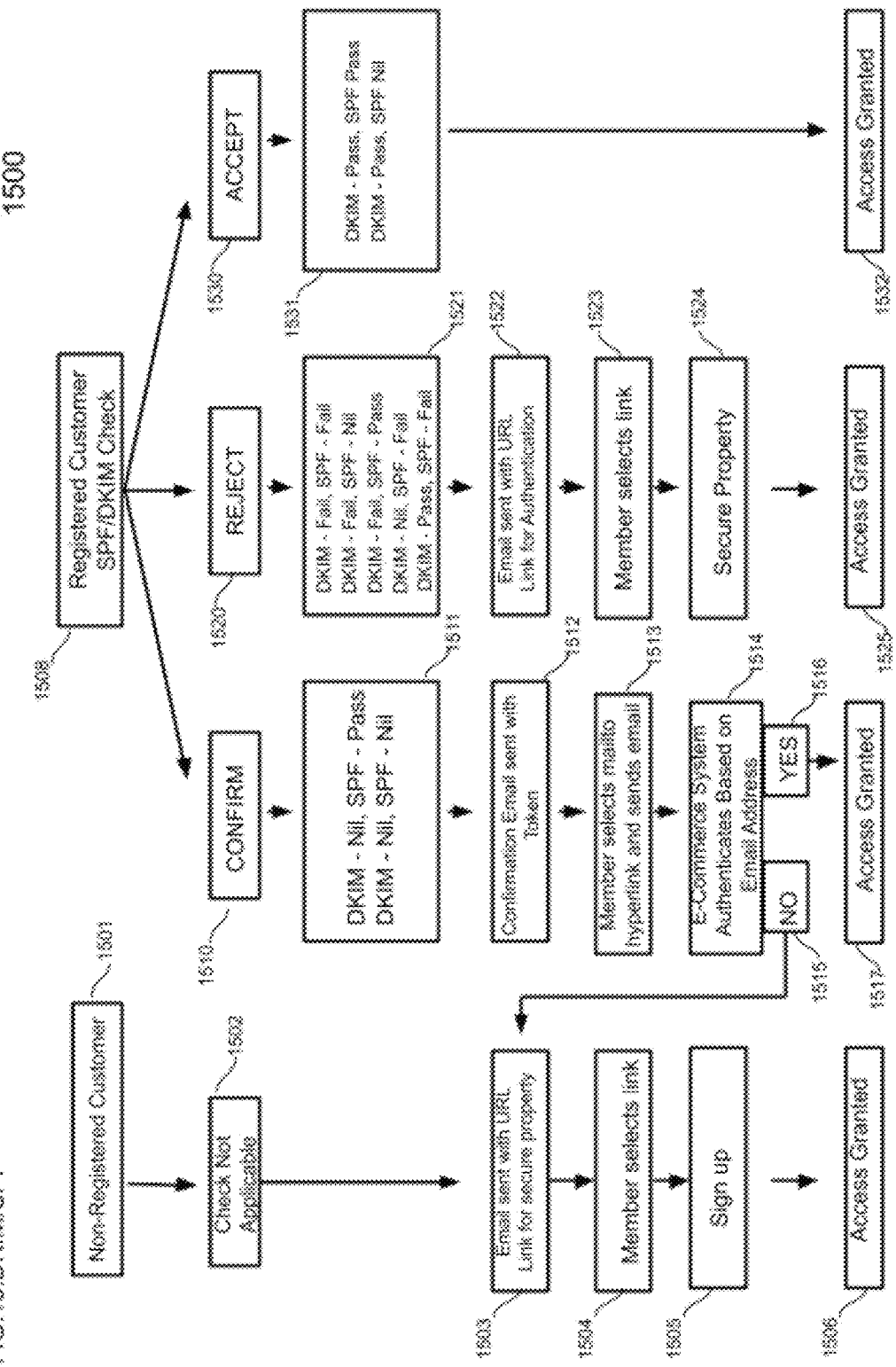
FIG. 15 illustrates aspects of the DKIM/SPF authentication process.

Various forms of authentication may be used, such as SPF, DKIM, and DMARC. Authentication may be limited to DKIM, DMARC, or SPF path-based authentication (an example authentication method is depicted in FIG. 15). The authentication system 140 authenticates the customer's email using the digital signature. The authentication system 140 may take one or more actions based on the outcome of the authentication process. The authentication system 140 may perform a lookup of the customer's account using the identifier and or email address. The authentication system 140 may not require any identifier. If the customer is not authenticated or is missing information, or does not have an account, the customer may be navigated to a signup page for registration with the vendor and the authentication system 140. If all requirements are met, the authentication system 140 notifies the vendor system of successful authentication and shares the identifier with the vendor at step 780. The vendor then grants secure access to the customer's device at step 790. Alternatively, the authentication system 140 may grant access directly on behalf of the vendor. Although in this example, granting access to a secure web page is described, it is an example only. Various secure transactions may be granted. A secure transaction could be access to a secure server, secure website, payment processing, video streaming accounts, control of a digital currency, record keeping, securities, and/or contracts.

Figure 8:
FIG. 8 is an example user interface for use in the authentication process.

FIG. 8 is an example of a user interface that may be hosted on the vendor or third party page that presents customer the customer with login options. The customer may select the "Send Magic Message" option 806 (Magic Message) or "Get Magic Link" option 804 (Swoop's Magic Link).

If the customer selects "Send Magic Message" option 806, the customer enters transactional process 700 at step 710. (The clicking of option 806 corresponds to visiting the web page). If it is the first time a "Magic Message" is sent from the customer device 150, the customer may be prompted to choose how the email is to be checked.

If the customer selects "Swoop's Magic Link" option 804, the customer enters transactional process 1600 at step 1610. (The clicking of option 804 corresponds to visiting the web page).

Figure 9:
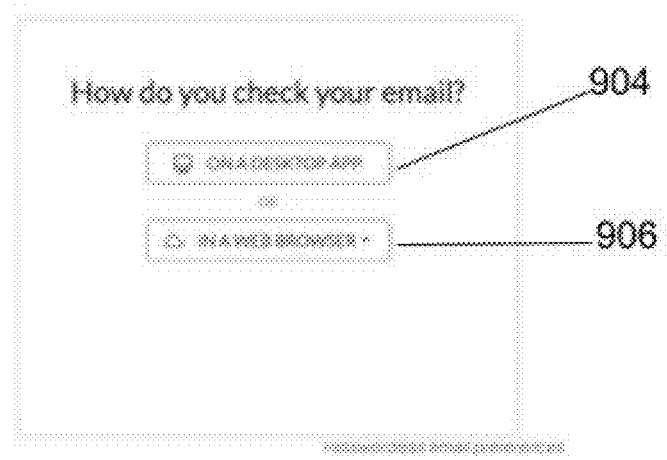
FIG. 9 is an example user interface for configuring aspects of the authentication process.

FIG. 9 is an example of a user interface that may be shown after the user selects "Send Magic Message" option 806. This user interface may be used so that Various options may be offered and may include an optional version for desktop client applications such as Apple Mail or in a web browser such as Gmail. The customer may select the type method used to check email accounts by selecting "On a Desktop App" 904 or "In a Web Browser" 906. This step may not always be necessary and may be offered in a dynamic nature when required by the vendor, third party, or the authentication system 140. This selection may be saved as the preferred method for authorizing the authentication system 140 for any property moving forward.

FIG. 10 is an example of a response email 1000 that may be sent from the customer device 150 to the authentication system 140. The response email 1000 is sent to an email address 1004 of the authentication system 140. In FIG. 10, the token is included in the email address. However, in other embodiments, the token may be contained in the subject field 1006, in the body of the email 1008 or contained anywhere else in the email.

Figure 11:
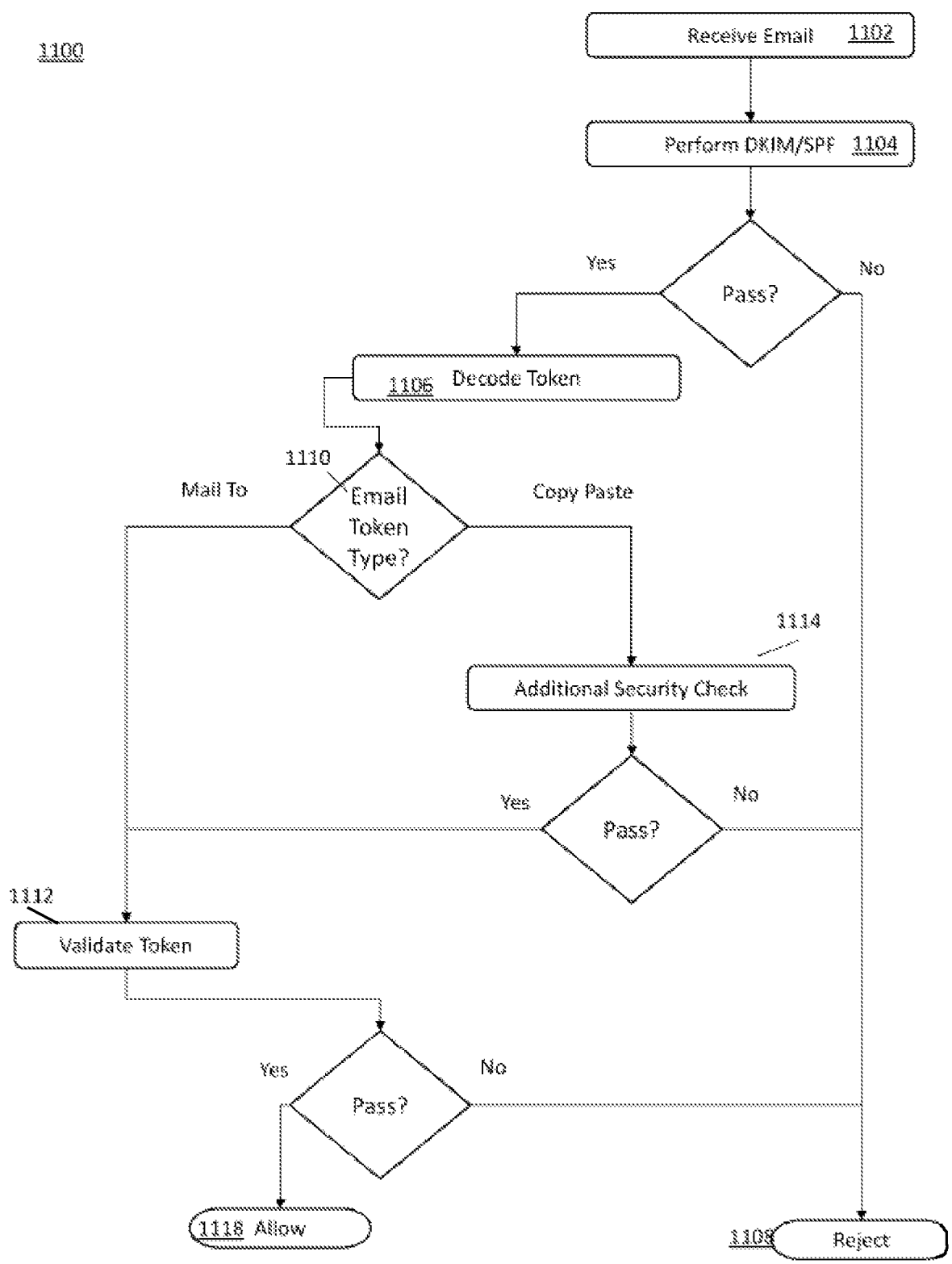
FIG. 11 is a process map for an example authentication process based on the email token type.

FIG. 11 is a process map for an authentication process 1100 that may be executed by authentication system 140. In step 1102, the response email 1000 is received from the customer device 105. Then in step 1104, the sender of the response email is authenticated utilizing DKIM/SPF. (An example DKIM/SPF authentication process is depicted in FIG. 15). If the DKIM/SPF authentication process is successful, the token contained in the response email 1000 is then decoded in step 1106. If the DKIM/SPF is unable to authenticate the sender of the response email 1000, the authentication attempt is rejected in step 1108. If the authentication is rejected, the sender of the email may be notified of the unsuccessful authentication In step 1106, the token contained in the response email 1000 is decoded, and a determination of whether additional security checks are required is determined based on information contained in the token in step 1110. For example, if the token type indicates that the token was for a "mail to link," then an additional validation may not be required and the customer is validated in step 1112. Similarly, additional validations may not be required based on the type of browser, type of transaction, or any other information contained in the token. The validation performed in step 1112 may include confirming that the email address contained in the token matches the email address that sent the response email 1000, or the validation may confirm any of the other parameters contained in the token.

If in step 1110, the determination indicates that additional security checks are required, the additional checks are be performed in step 1114. For example, additional security checks may be required when the token type indicates that the token was for a "copy-paste." Likewise, additional validations may be required based on the type of browser, type of transaction, or any other information contained in the token. These additional security checks may include performing a multi-factor authentication (MFA) or validating additional values contained in the token.

If the result of the additional security checks performed in 1114 passes, the token is validated in step 1112. Otherwise, if the additional security checks performed in either 1114 do not pass, the authentication request is rejected in step 1108.

In step 1112, if the validation of the token is successful, the authentication is allowed in step 1118.

Figure 12:
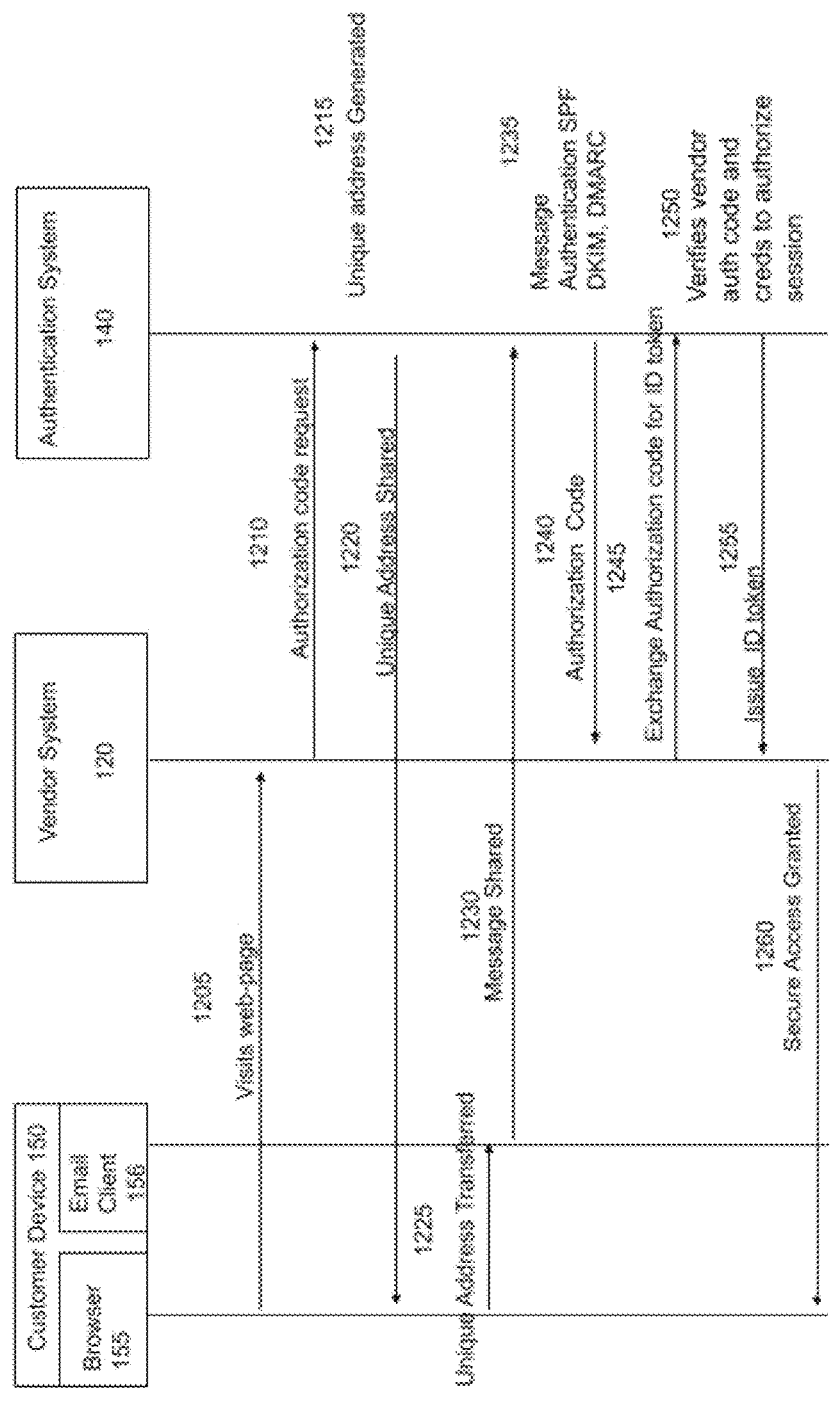
FIG. 12 is a transactional flow diagram illustrating an embodiment that authenticates a message.

FIG. 12 (Magic Address) is a transactional flow diagram 1200 illustrating the process of a customer accessing a secure account without the use of a password. A customer using the customer device 150 may access a web page via a web browser. The web page may be a sign-in, login, or payment page, among other possible secure transactions. It may also be an application. The customer using the customer device visits the vendor site or web page at step 1205. (FIG. 8 is an example of the vendor or third-party page with the login option.) The customer selects the "Send Magic Message" option 806. (Magic Message).

Figure 13:
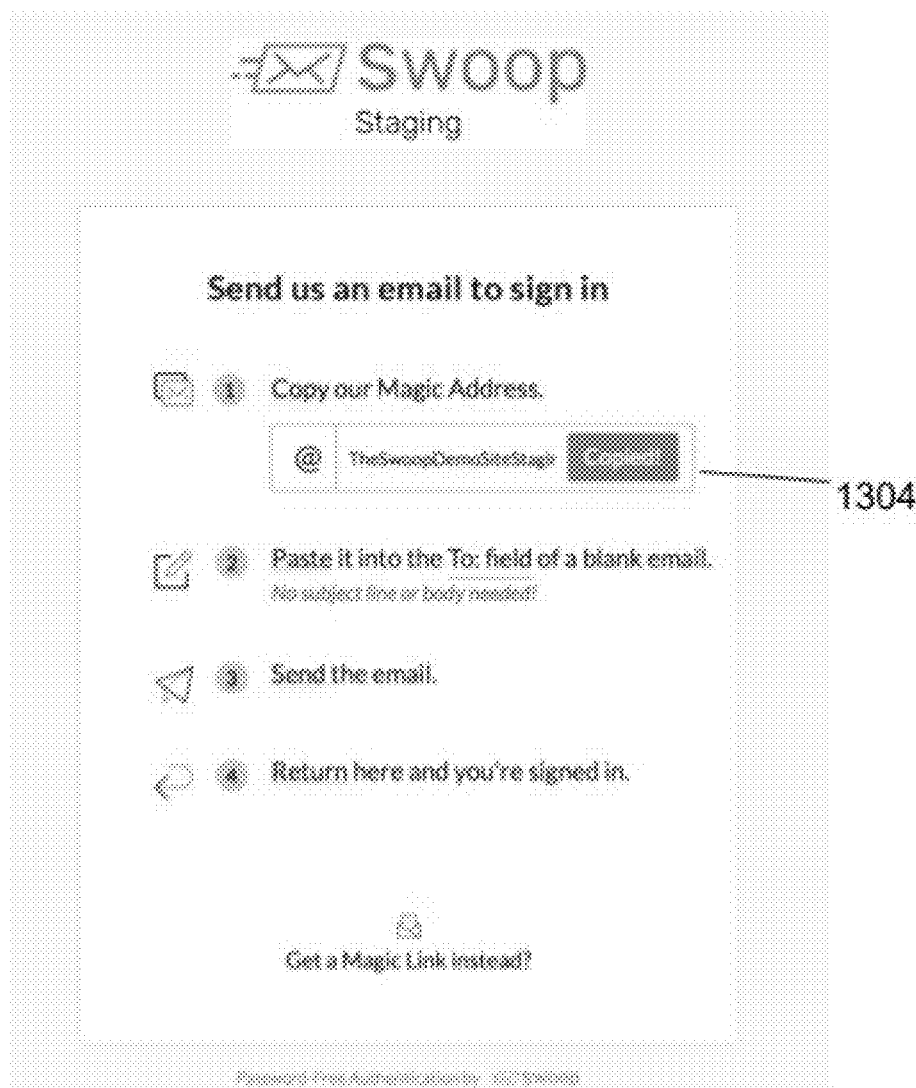
FIG. 13 is an example user interface for use in the authentication process.

The vendor system 120 transmits an authorization code request to the Authentication system 140 at step 1210. The authentication system 140 generates a unique token and a unique email address that incorporates the unique token at step 1215. In many instances, the unique token identifies that the token was generated for a "copy and paste" login. Then the authentication server 140 shares the unique email address with the customer device at step 1220. (FIG. 13 is an example of an interface that may be displayed on the customer device that allows the customer to make a selection to copy the unique email address 1304.) The unique email address is transferred to the email message 1225. The customer may paste the unique email address into the "To" field of an email, or this may happen in an automated fashion. The other fields of the email may not require any additional text and may be blank. (FIG. 10 is an example of an email with a unique email address 1004.) The customer sends the email and shares the message with the Authentication system 140 at step 1230. The Authentication system 140 authenticates the email message at step 1235.

Various forms of authentication may be used, such as SPF, DKIM, and DMARC. Authentication may be limited to DKIM, DMARC, or SPF path-based authentication. The authentication system 140 authenticates the customer's email using the digital signature. The authentication system 140 may take one or more actions based on the outcome of the authentication process. The authentication system 140 may perform a lookup of the customer's account using the identifier and or email address. The authentication system 140 may not require any identifier. If the customer is not authenticated or is missing information, or does not have an account, the customer may be navigated to a signup page for registration with the vendor and the authentication system 140. If all requirements are met, the authentication system 140 shares the authorization code with the vendor system at step 1240. The vendor system exchanges the authorization code for the ID token with the authentication system 140 at step 1245. The authentication system 140 verifies the authorization code and credentials from the vendor to authenticate the session at step 1250. The authentication system 140 issues the ID token and shares it with the vendor system at step 1255. The vendor system decodes the ID token, and grants secure access to the customer device 150 at step 1260.

Alternatively, the authentication system 140 may grant access directly on behalf of the vendor. Although in this example, granting access to a secure web page is described, it is an example only. Various secure transactions may be granted. A secure transaction may be access to a secure server, secure website, payment processing, video streaming accounts, control of a digital currency, record keeping, securities, and/or contracts.

The process of granting access to a customer may allow access to more than one account and more than one customer. Alternatively, because the account is associated with access to a single email account, the authentication system 140 may use this as a product to constrict use to a single user. This would significantly reduce the communal use of shared passwords. Alternatively, the customer may utilize the authentication notification and grant access to a third-party vendor.

Figure 14:
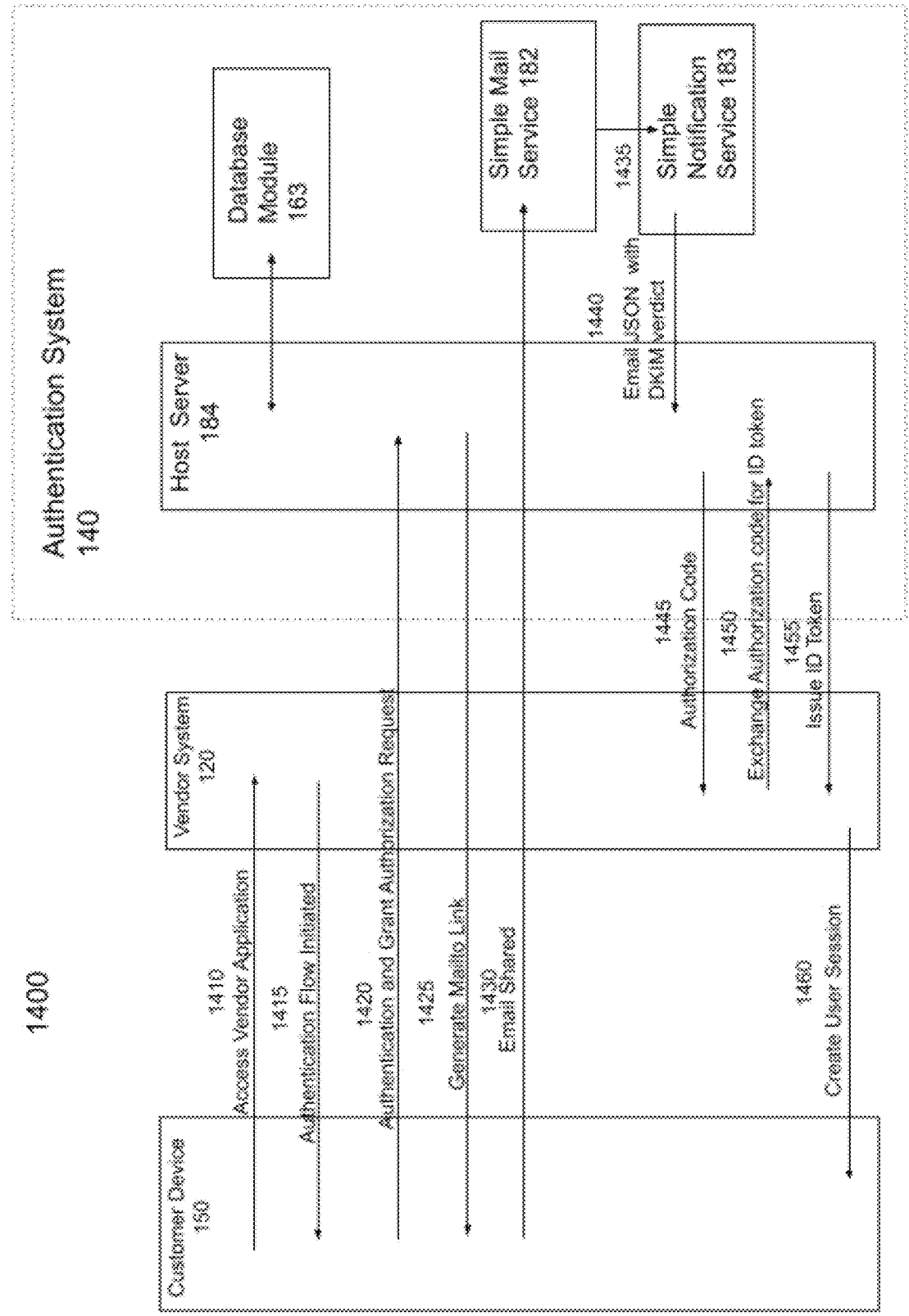
FIG. 14 is a transactional flow diagram illustrating an embodiment that authenticates a message.

FIG. 14 is a transactional flow diagram 140 0 illustrating the process where a customer is authenticated in an email-based login without the use of a password. The customer using the customer device 150 accesses the vendor system 120 and requests authentication for secure login at step 1410. The vendor system 120 initiates the authentication flow transmitting to the customer device at step 1415. The customer device 150 shares an authentication and authentication grant request with the host server 184 of the authentication system 140 at step 1420. The authentication system then generates a mailto link and shares this with the customer device at step 1425. This link may contain a token or other unique identifier. This may also be another link form capable of composing an email. The mailto link may generate an email with a unique address and is addressed to the authentication system 140. Alternatively, the token or unique identifier could be anywhere in the email. The customer device shares the email message with the authentication system 140 at the simple mail service 182 module at step 1430. A simple mail service of the Email I/F 147 module, together with the simple notification service of the Email I/F module 147, process the email and shares a JSON payload and DKIM Verdict and SPF verdict and a DMARC verdict with the host server 184 at step 1440. Based on the response received, the authentication system 140 determines if those requirements are met. If they fail to meet the set criteria, the host server may reject the request. If additional security is required, such as multi-factor authentication, the authentication system 140 may initiate that process.

If all requirements are met, the authentication system 140 shares the authorization code with the vendor system 120 at step 1445. The vendor system 120 then exchanges the authorization code for the ID token with the host server 184 at step 1450. The authentication system 140 then processes the authorization code and credentials from the vendor to authenticate the session. The authentication system 140 then issues the ID token and shares it with the vendor system 120 at step 1455. The vendor system 120 with the id token creates the vendor session at step 1460. The customer device 150 is granted access.

Alternatively, the authentication system 140 may grant access directly on behalf of the vendor. Although in this example, granting access to a secure web page is described, it is an example only. Various secure transactions may be granted. A secure transaction may be access to a secure server, secure website, payment processing, video streaming accounts, control of a digital currency, record keeping, securities, and/or contracts.

FIG. 15 is a flow diagram of an Authentication system 140 authenticating received emails from registered and non-registered customers utilizing DKIM/SPF in order grant access to a secure web page. However, access to a secure webpage is for example only and in other instances access may be granted to an online shopping cart or for granting access to process an order. When the Authentication system 140 receives a response email, it must determine whether the response is from a non-registered customer or a registered customer; this may be based, for example, on the email address associated with the sender of the email. Once the Authentication system 140 has determined whether the email was sent from a registered or non-registered customer, the Authentication system 140 may determine whether the email was received from an authenticated source.

Whether or not the DKIM and SPF validations succeed, the Authentication system 140 may determine that an email is received from a non-registered customer (step 1501). This may be based on, for example, the email address of the customer or information embedded in the email, including the token. If this is the case, the Authentication system 140 may determine that an SPF/DKIM check is not applicable (step 1502). The Authentication system 140 may send an email to the non-registered customer with an URL hyperlink for a web checkout (step 1503). The non-registered customer may select the URL hyperlink in the email, which directs the non-registered customer to a web page based on the URL (step 1504). The non-registered customer may then complete registration on the web page (step 1505). This could be a web checkout or access to a secure server. By completing the registration, the non-registered customer may be registered with the Authentication system 140, either automatically or by selecting an option. Access is granted to the secure property (step 1506).

The Authentication system 140 performs an SPF/DKIM check on the email to check for valid DKIM signatures and SPF records (step 1508). These are used to detect whether incoming messages have been mimicked. A mimicked message may be an email message that appears to have been sent by a user but was sent by another user. This may often be seen in spam messages appearing to be from a known source. Based on the authentication procedure, the Authentication system 140 may confirm, reject, or accept the authentication.

In one scenario, after the SPF/DKIM check, the Authentication system 140 may determine that a confirmation of the sender is needed (step 1510). The confirmation may be requested, for example, based on user preferences, or if the Authentication system 140 requests additional information. The Authentication system 140 may determine a confirmation is needed when the DKIM is Undefined, and the SPF is either Pass or Undefined (step 1511). In this scenario, the Authentication system 140 may generate a confirmation email message that includes a mailto link with a token to confirm the identity via an email message (step 1512). In this instance, the email and token may be integrated as a secondary system for a single-click experience. When the customer receives the email, they select the hyperlink and generate a response email that they send back to the Authentication system 140 (step 1513). When the Authentication system 140 receives the response to the confirmation email message, the Authentication system 140 104 authenticates the customer, based on the email address this message was sent from and the email address embedded within the token (step 1514). If this is confirmed as a YES (step 1516), then the Authentication system 140 may decode the token and grant access to a secure property or process payment and send notifications to the customer and vendor server (step 1517). If the email targeted token arrives back at the Authentication system 140 and is not recognized as registered and confirmed as a NO (step 1515), then the Authentication system 140 may send the customer an email with a URL hyperlink driving them to a signup and web checkout page. This web checkout may be located on the Authentication system 140 or integrated with an API on the vendor server 120, or it may be on a third-party system.

In another scenario, the Authentication system 140 may reject the email (step 1520). This may occur when the DKIM Fails, and the SPF either comes up Failed, Undefined, or Passes OR the SPF Fails, and the DKIM is Undefined or Pass (step 1521). In this situation, the Authentication system 140 may not confirm the outgoing email server of the received email message. The Authentication system 140 may generate a response email addressed to the customer that includes a URL hyperlink for the messages categorized as Reject (step 1522). When this URL hyperlink is selected (step 1523), the customer opens a web-based registration and uses the URL to complete registration for the secure property (step 1524). This could be a web checkout or access to a secure server. This secure property may be part of the vendor server 120 or hosted by the Authentication system 140. The secure property may also request the user to enter registration information. Once the registration is complete, access is granted in step 1525.

In the third scenario, the Authentication system 140 accepts the response (step 1530) email and is able to successfully authenticate a registered user. For example, this may occur when the Authentication system 140 generates an email address with a token embedded in the email address. This email address with the token may be accessed by a mailto link generated by the Authentication system 140 or may be copy and pasted into the "To" field of an email. That email is addressed to the email Authentication system 140. The customer sends the email. Once the email is sent, the DKIM/SPF process begins. If the Authentication system 140 determines that the received email is from a registered customer and both the DKIM and SPF are present and valid, the received message may be categorized and processed as an Accept by the Authentication system 140 (step 1531). The token is decoded, and the customer is granted secure access (step 1532).

In an alternative embodiment where any customer's message that is categorized as either Non-registered, Confirm, or a Reject may all receive an email response that drives them to a URL. This may be a preference of the vendor or may be in response to other environmental indicators such as the rate of Confirmations, Rejections, and Acceptances the system is currently detecting.

Figure 16:
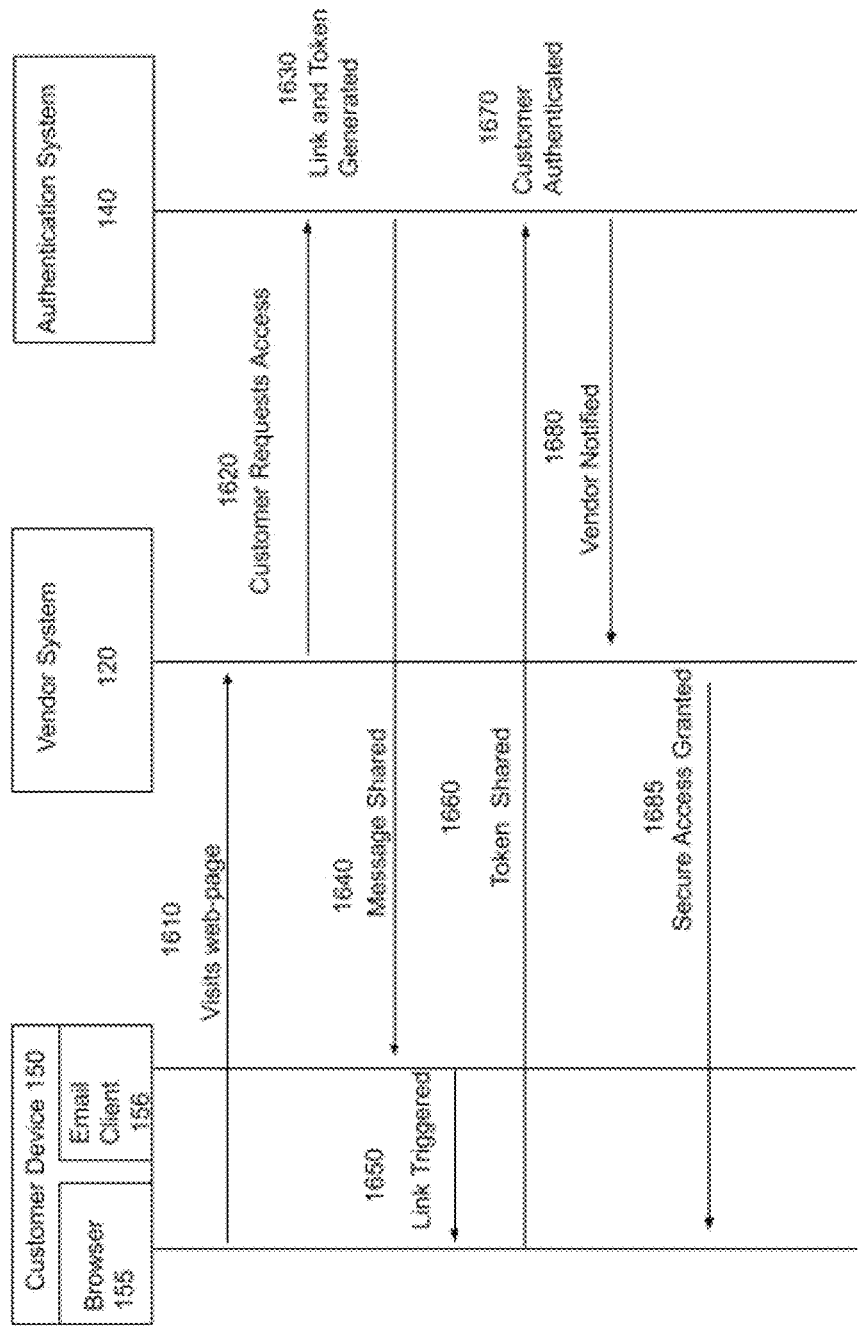
FIG. 16 illustrates an example login process.

FIG. 16 (Magic Link Basic) is a transactional flow diagram 1600 illustrating an authentication process for a customer for accessing a secure account without the use of a password by requesting an email. A customer using the customer device 150 may access a web page via a web browser. The web page may be a sign-in, login, or payment page or request for other types of secure access. The customer using the customer device 150 visits the vendor site or web page at step 1610. (FIG. 8 is an example of the vendor page with the login option 804 (Swoop's Magic Link)). The customer, via the vendor web page, submits a request. This may require the customer to enter their email address or other identifiers. This may also happen in an automated fashion not visible to the customer. The vendor system 120 transmits the address to the authentication system 140 at step 1620. The authentication system 140 generates an email addressed to the customer's email address that includes a login link with a token at step 1630. The authentication system 140 shares the email message and link with a token with the customer at step 1640. The link may be embedded behind an image, such as a button graphic. The customer accesses the email via the customer email client 154. The link in the email message may be triggered in an automated fashion. The customer may be required to select the link. The link is activated, triggering the customer browser at step 1650 and shares the token with the authentication system 140 at step 1660. The authentication system 140 decodes and validates the token and authenticates the message of the customer at step 1670. If all requirements are met, the authentication system 140 updates the vendor system that the customer is authenticated at step 1680. Alternatively, when the token is returned and the authentication system 140 authenticates the customer, the authentication system 140 may complete a secure transaction.

If all requirements are met, the authentication system 140 may notify the vendor system of successful authentication and shares the identifier with the vendor system at step 1680. The vendor system then grants secure access to the customer device at step 1690. Alternatively, the authentication system 140 may grant access directly on behalf of the vendor. Although in this example, granting access to a secure web page is described, it is an example only. For example, in other instances access may be granted to an online shopping cart or for granting access to process an order.

Figure 17:
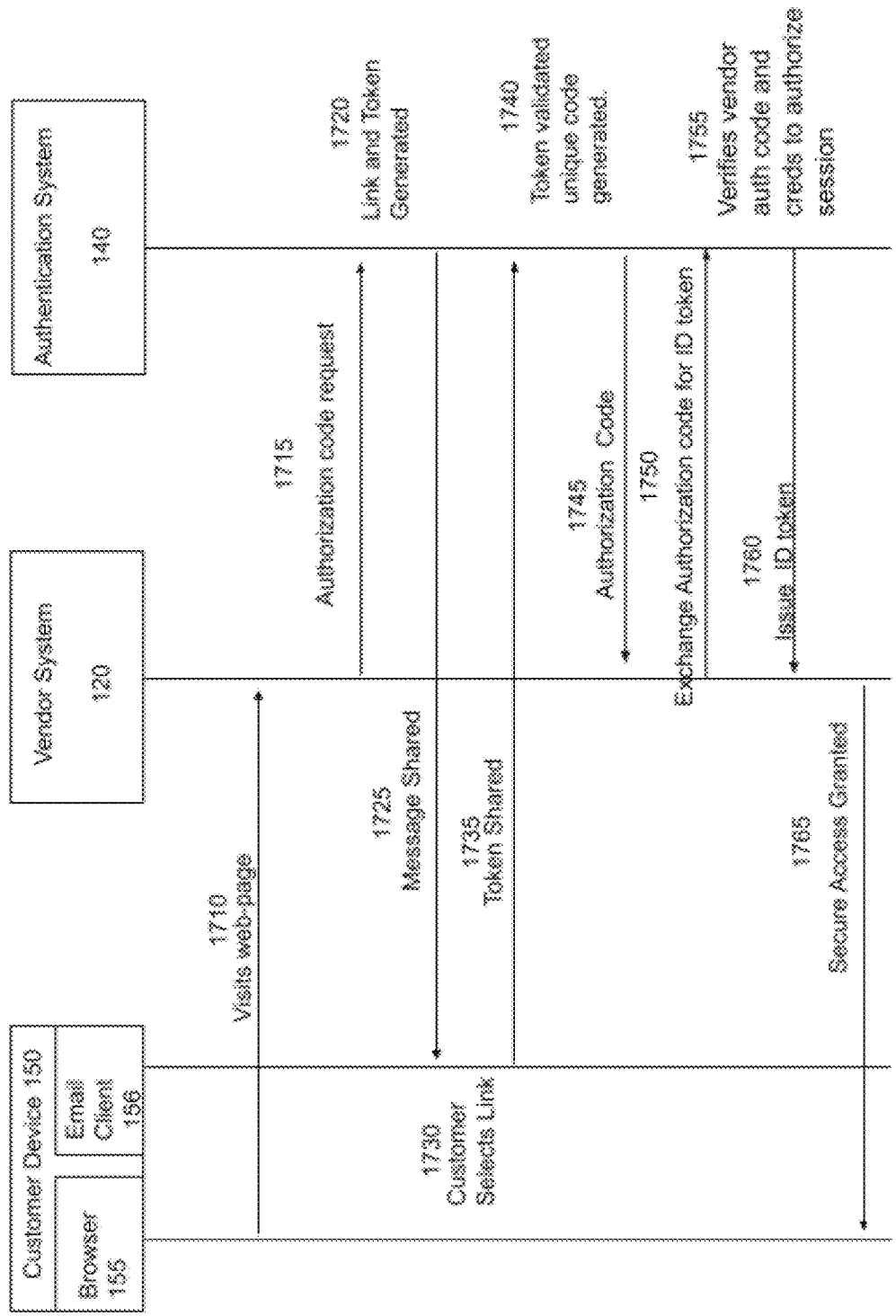
FIG. 17 is a transactional flow diagram illustrating an embodiment that utilizes Oauth.

FIG. 17. Magic Link (Complex) is a transactional flow diagram 1700 illustrating an authentication process for a customer accessing a secure account without the use of a password by requesting an email. A customer using the customer device 150 may access a web page via a web browser. The web page may be a sign-in, login, or payment page or request for other types of secure access. The customer using the customer device 150 visits the vendor site or web page at step 1710. (FIG. 8 is an example of the vendor page with the login option (Swoop's Magic Link)). The customer, via the vendor web page, submits a request. This may require the customer to enter their email address or other identifiers. This may also happen in an automated fashion not visible to the customer. The vendor system or third party transmits an authorization code request to the Authentication system 140 at step 1715. The authentication system 140 generates an email addressed to the customer's email address that includes a login link with a token at step 1720. The authentication system 140 shares the email and links with a token with the customer device 150 at step 1725. The link may be embedded behind an image, such as a button graphic. The customer using the customer device 150 accesses the email via the customer email client 156. The link in the email message may be triggered in an automated fashion. The customer may be required to select the link. The link is activated, triggering the customer browser at step 1730 and shares the token with the authentication system 140 at step 1735. The authentication system 140 decodes and validates the token and authenticates the message of the customer at step 1740. Alternatively, when the token is returned and the authentication system 140 authenticates the customer, the authentication system 140 may complete a secure transaction.

The token is decoded, and if all requirements are met, If all requirements are met, the authentication system 140 shares the authorization code with the vendor system at step 1745. The vendor system exchanges the authorization code for the ID token with the authentication system 140 at step 1750. The authentication system 140 verifies the authorization code and credentials from the vendor to authenticate the session at step 1755. The authentication system 140 issues the ID token and shares it with the vendor system at step 1760. The vendor system decodes the ID token, and grants secure access to the customer device 150 at step 1765. Alternatively, the authentication system 140 may grant access directly on behalf of the vendor.

Figure 18:
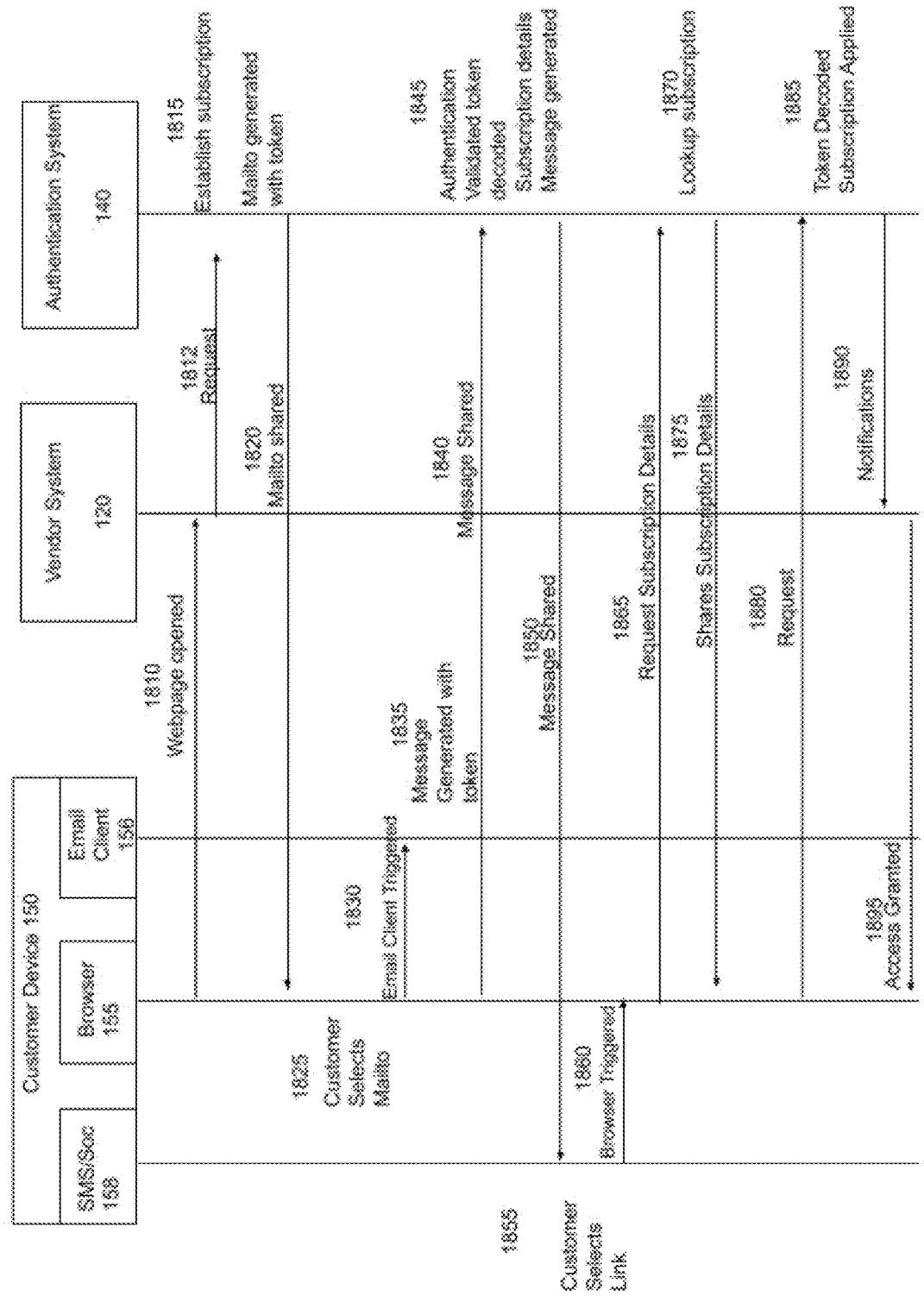
FIG. 18 is a transactional flow diagram illustrating an embodiment that utilizes SMS.

FIG. 18 is a transactional flow diagram 1800 illustrating the authentication process of a customer accessing a secure account without the use of a password with multiple factors of authentication. A customer using the customer device may access a web page via a web browser at step 1810. The web page may be a sign-in, login, or payment page or request for other types of secure access. The customer using the customer device 150 visits the vendor site or web page and initiates a login process. This may require entering an email address or phone number. The customer shares the authentication request with the authentication system 140 at step 1812. The authentication system 140 establishes a subscription and generates a token for that session. The authentication system 140 generates an email message addressed to the account of the customer device and includes a mailto link with the token at step 1815. The authentication system 140 shares the message with the customer device 150 at step 1820. The customer using the customer device 150 accesses, and the customer selects the mailto link at step 1825. The mailto link may be substituted for an equivalent link capable of generating an email message. The selection of the link may be triggered automatically without the need of the customer to make a selection. The selection of the link at step 1830 opens the email client and generates an email response message addressed with at least one identifier/token to the authentication system 140 at step 1835. The identifier may be anywhere in the message. The customer shares the email message and identifier with the authentication system 140 at step 1840. The authentication system 140 receives the email from the customer device and authenticates the message at step 1845.

Various forms of authentication may be used, such as SPF, DKIM, and DMarc. Authentication may be limited to DKIM, DMARC, or SPF path-based authentication. The authentication system 140 authenticates the customer's email using the digital signature. The authentication system 140 may take one or more actions based on the outcome of the authentication process. The authentication system 140 may process the decode, process the token or identifier. The authentication system 140 may perform a lookup of the customer's account using the identifier and or email address. The authentication system 140 may not require any identifier. If the customer is not authenticated or is missing information, or does not have an account, the customer may be navigated to a signup page for registration with the vendor and the authentication system 140. If all requirements are met, the authentication system 140 determines the subscription details of the session and generates an SMS, or social media message addressed to the customer device with a request for the subscription in a URL link at step 1845. The authentication system 140 shares the message with the URL Link with the customer device at step 1850. The customer selects the URL link at step 1855. The selection of the link may be triggered automatically without the need of the customer to make a selection. The selection of the link activates the browser at step 1860 and transmits the subscription details request at step 1865. The authentication system 140 receives the request and looks up the subscription details at step 1870, and broadcasts the subscription details to the customer device at step 1875. The customer device browser receives the subscription details and makes a request, and may contain a token to the authentication system 140 at step 1880. The authentication system 140 decodes the token, and the subscription is applied at step 1885.

If all requirements are met, the authentication system 140 may notify the vendor system of successful authentication and share the identifier with the vendor at step 1890. The vendor then grants secure access to the customer's device 150 at step 1895. Alternatively, the authentication system 140 may grant access directly on behalf of the vendor.

Figure 19:
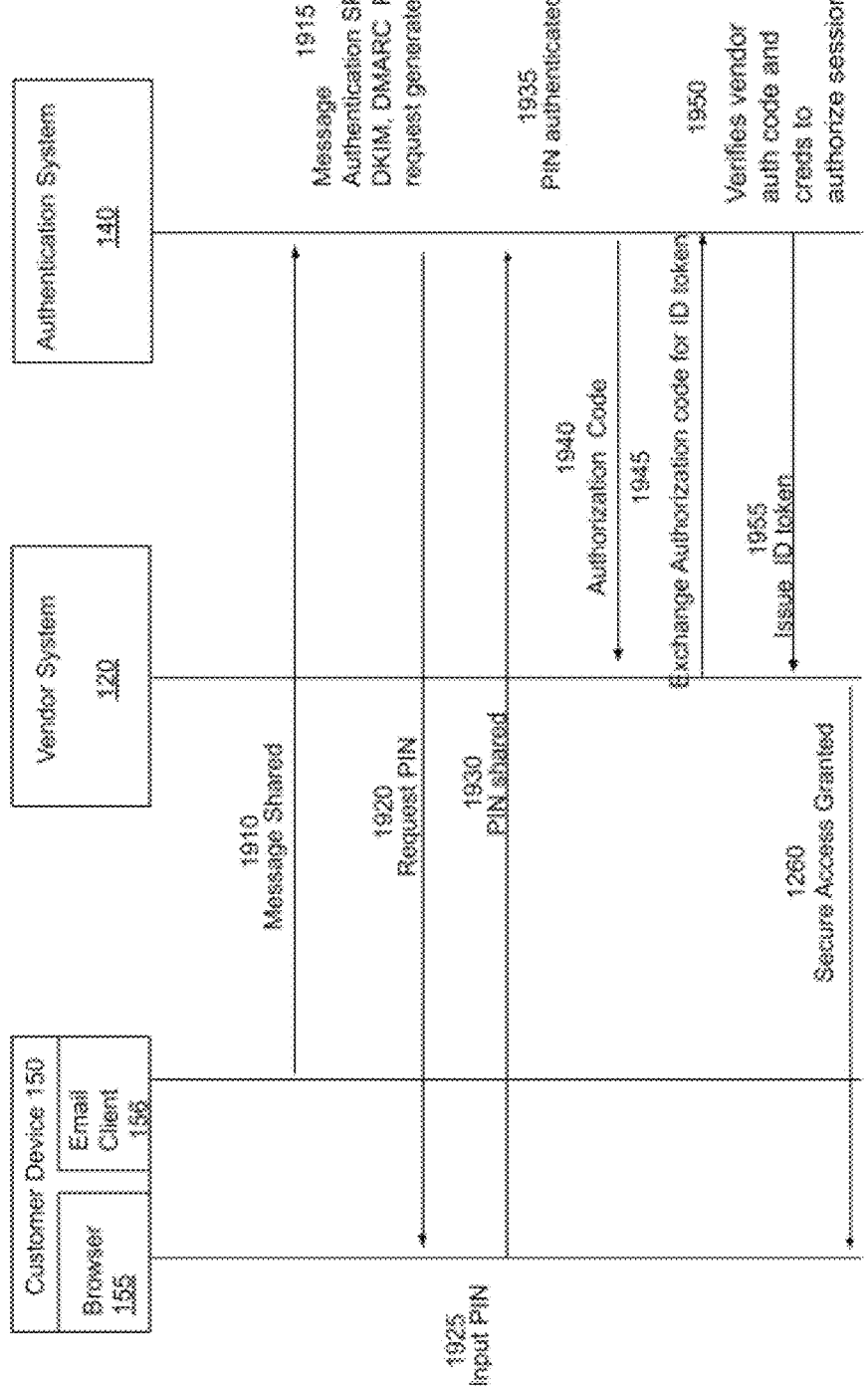
FIG. 19 is a transactional flow diagram illustrating an embodiment that utilizes a PIN.

FIG. 19 (PIN) is a transactional flow diagram 1900 illustrating the process of a customer accessing a secure account by email requiring an additional factor of authentication and fulfillment of CAPTCHA requirements. A customer using the customer device 150 sends the email and shares the message with the Authentication system 140 at step 1910. The Authentication system 140 authenticates the email message at step 1915.

Various forms of authentication may be used, such as SPF, DKIM, and DMarc. Authentication may be limited to DKIM, DMARC, or SPF path-based authentication. The authentication system 140 authenticates the customer's email using the digital signature. The authentication system 140 may take one or more actions based on the outcome of the authentication process. The authentication system 140 may perform a lookup of the customer's account using the identifier and or email address and determine that a PIN is required. If the email message is not authenticated or is missing information, or does not have an account, the customer may be navigated to a signup page for registration with the vendor and the authentication system 140. If all requirements are met, the authentication system 140 generates a PIN request at step 1915 and shares a request with the browser 155 at step 1920. The customer inputs the PIN at step 1925 and shares the PIN with the authentication system 140 at step 1930. The authentication system 140 authenticates the PIN at step 1935. If all requirements are met, the authentication system 140 shares the authorization code with the vendor system at step 1940. The vendor system exchanges the authorization code for the ID token with the authentication system 140 at step 1945. The authentication system 140 verifies the authorization code and credentials from the vendor to authenticate the session at step 1950. The authentication system 140 issues the ID token and shares it with the vendor system at step 1955. The vendor system decodes the ID token, and grants secure access to the customer device at step 1960. Alternatively, the authentication system 140 may grant access directly on behalf of the vendor.

Figure 20:
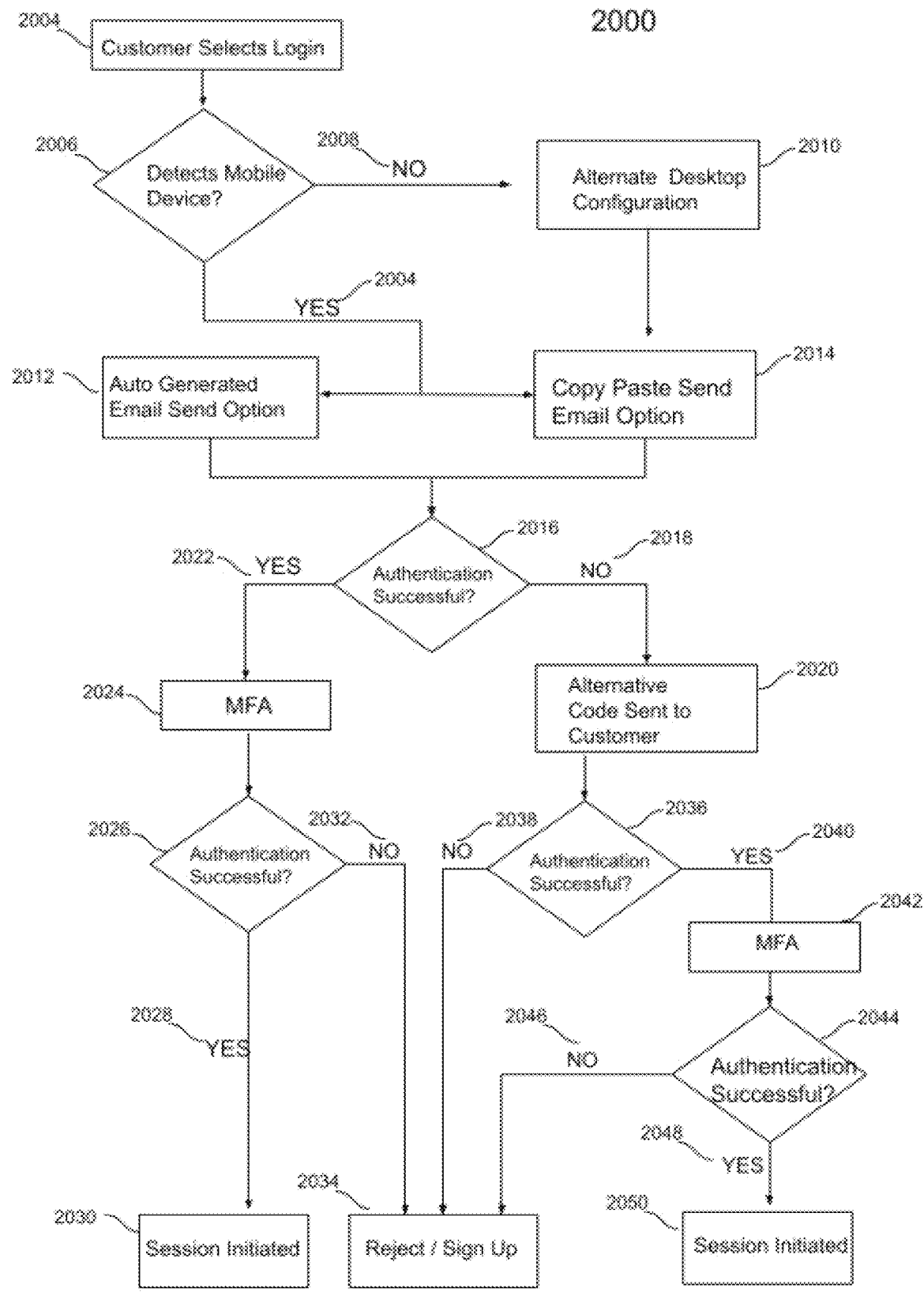
FIG. 20 is a process map illustrating an embodiment that utilizes different methods to generate the email message.

FIG. 20 is a flow diagram 2000 illustrating an authentication process for granting access without a password, including various security options that may be combined to initially authenticate a customer for future single click authentication. This configuration facilitates secure access for customers to private information on websites or applications without requiring a password. The customer using the customer device 150 requests selects login from the vendor system 120 at step 2004. The disclosed invention may determine the type of device the customer is using to log in and offer different versions of authentication at step 2006. Alternatively, the authentication system 140 may offer the customer a set of options. In this example, the system has two options YES at step 2004 for a mobile device or NO for a desktop option at step 2008. If The authentication system 140 determines NO at step 2008, the authentication system 140 may offer the customer an authentication method as described herein. If the authentication system 140 determines YES at step 2004, the customer may be offered a series of email-based authentication methods as described above. In this example, the customer is offered the option to select a link and mailto the link to generate an email message at step 2012. The customer is also offered the option to copy/paste an email address into an email and to send a message at step 2014. (Both these options are versions are described in FIG. 12.) Alternatively, the authentication system 140 may determine which options to display on the customer device. This may take into account many factors such as device type or operating system or security risk based on location. As described above, other forms of authentication could be substituted. If YES and the email are successfully authenticated at step 2022, the authentication system 140 may initiate the session, grant access, and log in to the customer device at step 2030. Alternatively, the authentication system 140 may require an additional level of authentication, such as Multi-Factor Authentication (MFA) at step 2024. It should be understood that the MFA requirement is an option and may not be used. FIG. 18 and FIG. 19 describe examples of multi-factor authentication that may be applied; however, it should be understood that various alternatives may be used. Referring to step 2032, if NO, the authentication system 140 may reject the customer and prompt them to sign up at step 2034. If YES at step 2028 and the multi-factor requirement is met, then the authentication system 140 may initiate the session, grant access, and log in to the customer device 150 at step 2030.

Referring back to step 2016 in FIG. 20, if NO at step 2018, the customer may be sent an email with a code that the customer must input at step 2020. If NO at step 2038, the authentication system 140 may reject the customer and prompt them to sign up at step 2034. If YES at 2040 and the Customer has successfully authenticated the authentication system, 140 may initiate the session, grant access, and log in to the customer device at step 2050. Alternatively, the authentication system 140 may require an additional level of authentication, such as Multi-Factor Authentication (MFA) at step 2042. FIG. 18 and FIG. 19 describe examples of multi-factor authentication that may be applied; however, it should be understood that various alternatives may be used. If NO at step 2046, the authentication system 140 may reject the customer and prompt them to sign up. If YES at step 2048 and the multi-factor requirement is met, then the authentication system 140 may initiate the session, grant access, and log in to the customer device 150 at step 2050.

Figure 21:
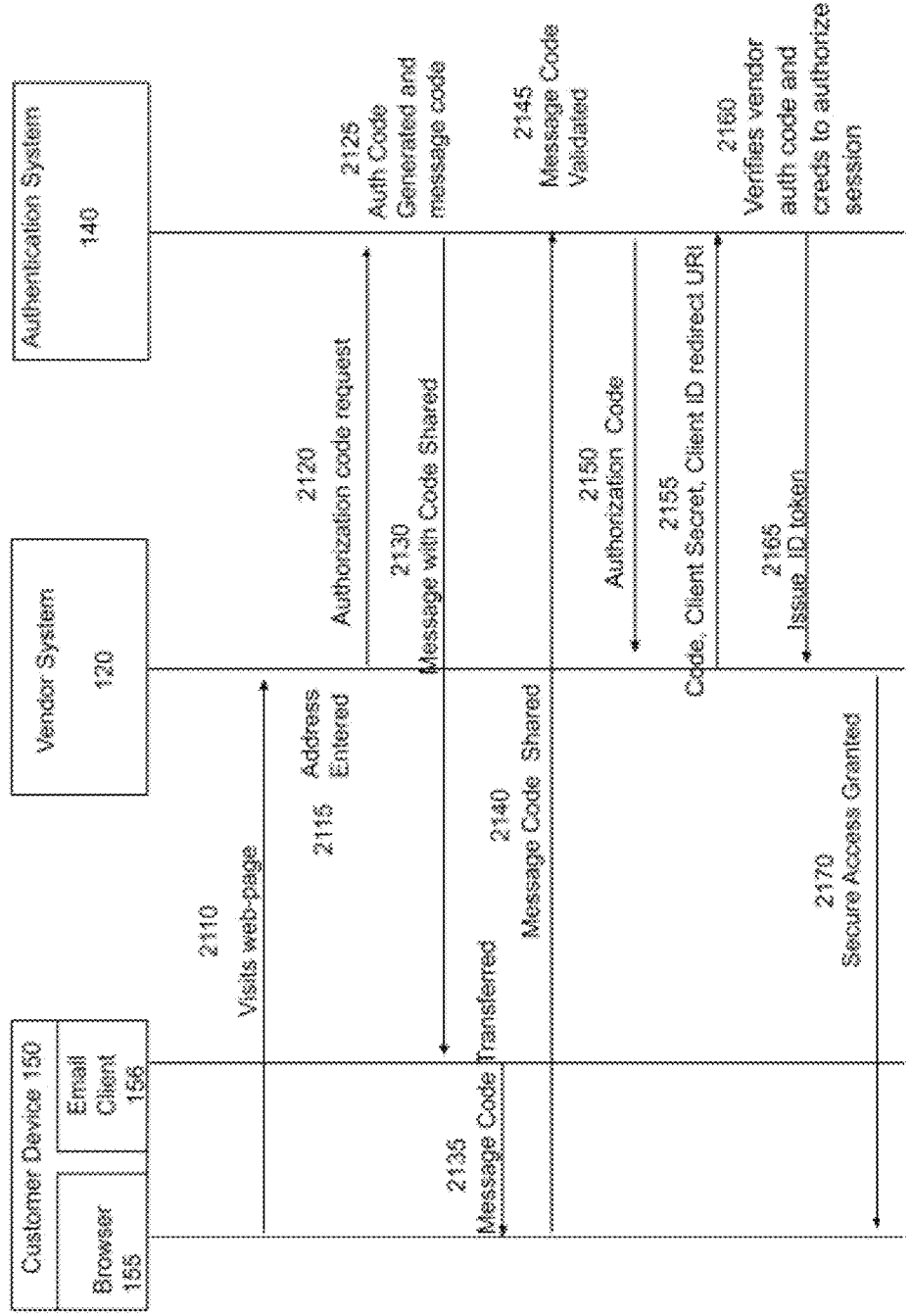
FIG. 21 is a transactional flow diagram illustrating an embodiment that utilizes an alternative authentication option.

FIG. 21 (Magic Code) is a transactional flow diagram 2100 illustrating the process of a customer accessing a secure account without the use of a password. This process may be used when a customer fails authentication or CAPTCHA. This process may also be used if the authentication system 140 determines that the device environment is a security risk or for easy use of the customer. The customer may be prompted automatically. A customer using the customer device 150 may access a web page via a web browser at step 2110. The web page may be a sign-in, login, or payment page, among other possible secure transactions. It may also be an application. The customer using the customer device visits the vendor site or web page. The customer may enter the email address associated with the account at step 2015. Alternatively, they may enter another identifier, such as a phone number or name. This may also happen in an automated fashion not visible to the customer. The customer submits the email address and shares an authorization with the authentication system 140 at step 2120. The authentication system 140 generates an authorization code and message code at step 2125 shares the message code with the customer device email client at step 2130. Alternatively, this may be facilitated through other messaging formats. The customer's device browser may prompt the customer to retrieve the message code from their email. The customer transfers the message code contained in the email to the web page on the browser at step 2135. The code may be transferred in an automated fashion and may not be visible to the customer. The customer submits the message code and shares the message with the authentication system 140 at step 2140. The authentication system 140 validates the message code and authenticates the customer at step 2145. If the customer inaccurately enters the code or does not have a code and is not authenticated or is missing information or does not have an account, the customer may be navigated to a signup page for registration with the vendor and the authentication system 140. If all requirements are met, the authentication system 140 shares the authorization code with the vendor system at step 2150. The vendor system exchanges the authorization code for the ID token with the authentication system 140 at step 2155. The authentication system 140 verifies the authorization code and credentials from the vendor to authenticate the session at step 2160. The authentication system 140 issues the ID token and shares it with the vendor system at step 2165. The vendor system decodes the ID token, and grants secure access to the customer device 150 at step 2170. Alternatively, the authentication system 140 may grant access directly on behalf of the vendor.

Figure 22:
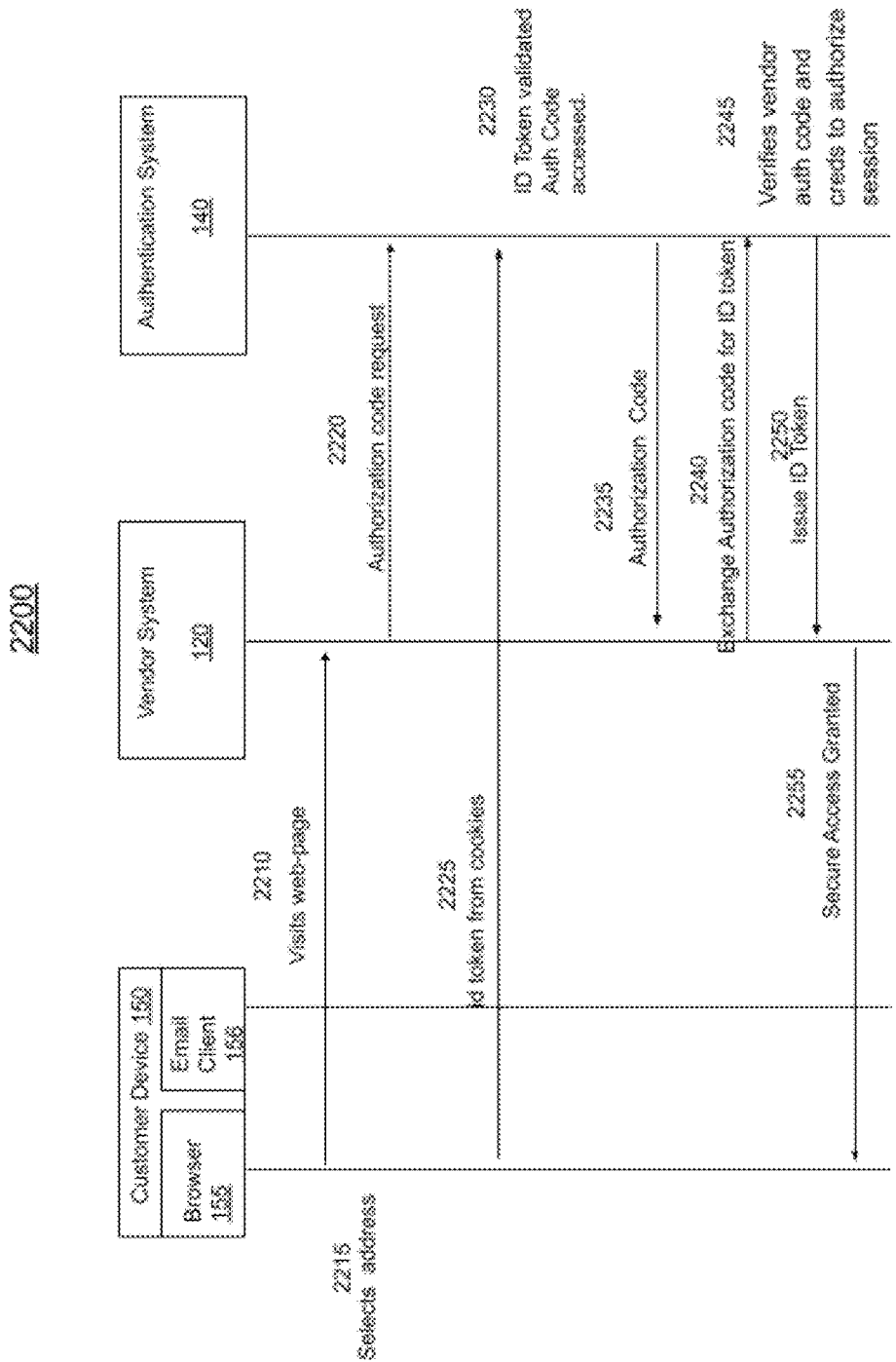
FIG. 22 is a transactional flow diagram illustrating an embodiment that utilizes Oauth.

FIG. 22 (One Click) is a transactional flow diagram 2200 illustrating the process of a customer is authenticated without the use of a password. A customer using the customer device 150 may access a web page via a web browser. The web page may be a sign-in, login, or payment page, among other possible secure transactions. It may also be an application. The customer using the customer device 150 visits the vendor site or web page at step 1210. (FIG. 23 is an example of the vendor or third-party page that is 1 click enabled).

As shown in FIG. 22, the customer device 150 may display the email address of the secure account of the customer. The customer selects the email account and submits the authorization code request to the authentication system 140 at step 2220, and the customer device 150 browser transmits the id token from cookies at step 2025.

The authentication system 140 validates the ID token and accesses the authorization code at step 2230. If the customer is not authenticated or is missing information, or does not have an account, the customer may be navigated to a signup page for registration with the vendor and the authentication system 140. If all requirements are met, the authentication system 140 shares the authorization code with the vendor system at step 2235. The vendor system exchanges the authorization code for the ID token with the authentication system 140 at step 2240. The authentication system 140 verifies the authorization code and credentials from the vendor to authenticate the session at step 1245. The authentication system 140 issues the ID token and shares it with the vendor system at step 2250. The vendor system decodes the ID token, and grants secure access to the customer device 150 at step 2255. Alternatively, the authentication system 140 may grant access directly on behalf of the vendor.

Figure 23:
FIG. 23 is an example user interface showing multiple email addresses that may be used with some embodiments.

FIG. 23 is an example of the interface a user may encounter, property name (2304), and hyperlink. For example, this interface may be used with the processes described in FIGS. 22 and 24 and any other embodiments of the invention described herein. With this convenient reference point, customers may reference what property they are authenticating with, and the customer may have quick access back to the originating URL or property homepage. FIG. 23 also depicts Last sign in (2310). If a customer has several email addresses that the customer authenticated, this feature reminds them of the email used during the previous authentication. Additionally, the figure depicts ADD ANOTHER EMAIL (2312). This is an option offered in the case that the customer does not find the expected email address listed. By selecting this option, the customer is sent back to the email-based options. After authentication, the e-commerce stores server-side cookies that allow for single-click authentication into the e-commerce system property. The integration of this method with email-based authentication avoids the password required to access a secure property.

As described above, FIG. 23 is an example of an email-based authentication system. The disclosed invention authenticates the customer identity for the vendor or third party. This allows the vendor or third party to take action on behalf of the customer in a secure manner and confirms the customer's identity. This allows for secure sign-in for customers. The customer is authenticated by either sending or receiving an email.

Figure 24:
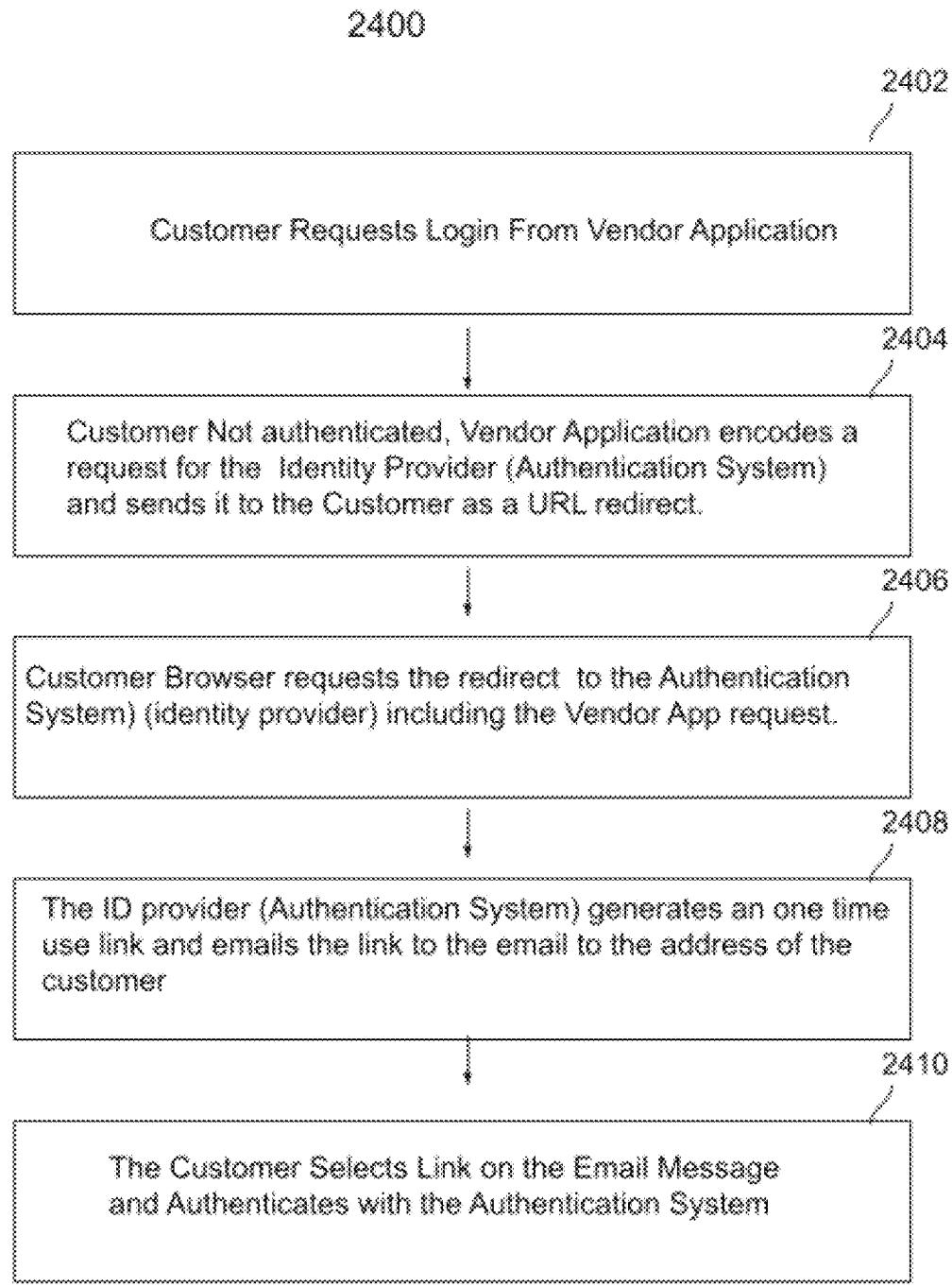
FIG. 24 is a process map illustrating an embodiment that utilizes Oauth.

FIG. 24 is a diagram 2400 illustrating an Email-Based OAuth for single-click authentication, a method for granting access without a password. Customers can access their private information on websites or applications without requiring a password. The Customer device requests login from the vendor system application at step 2402. The customer is not authenticated; the vendor system 120 encodes a request for the identity provider (Authentication system 140) and sends it to the customer device as a URL redirect at step 2404. The customer device 150 requests the redirect to the authentication system 140 (identity provider), including the vendor system 120 request at step 2406. The ID provider (Authentication system 140) generates a one-time use link and emails the link to the email to the address of the customer device at step 2408. The customer on the customer device 150 selects a link on the email message and authenticates with the Authentication system 140 at step 2410. This link may be selected in an automated fashion.

Figure 25:
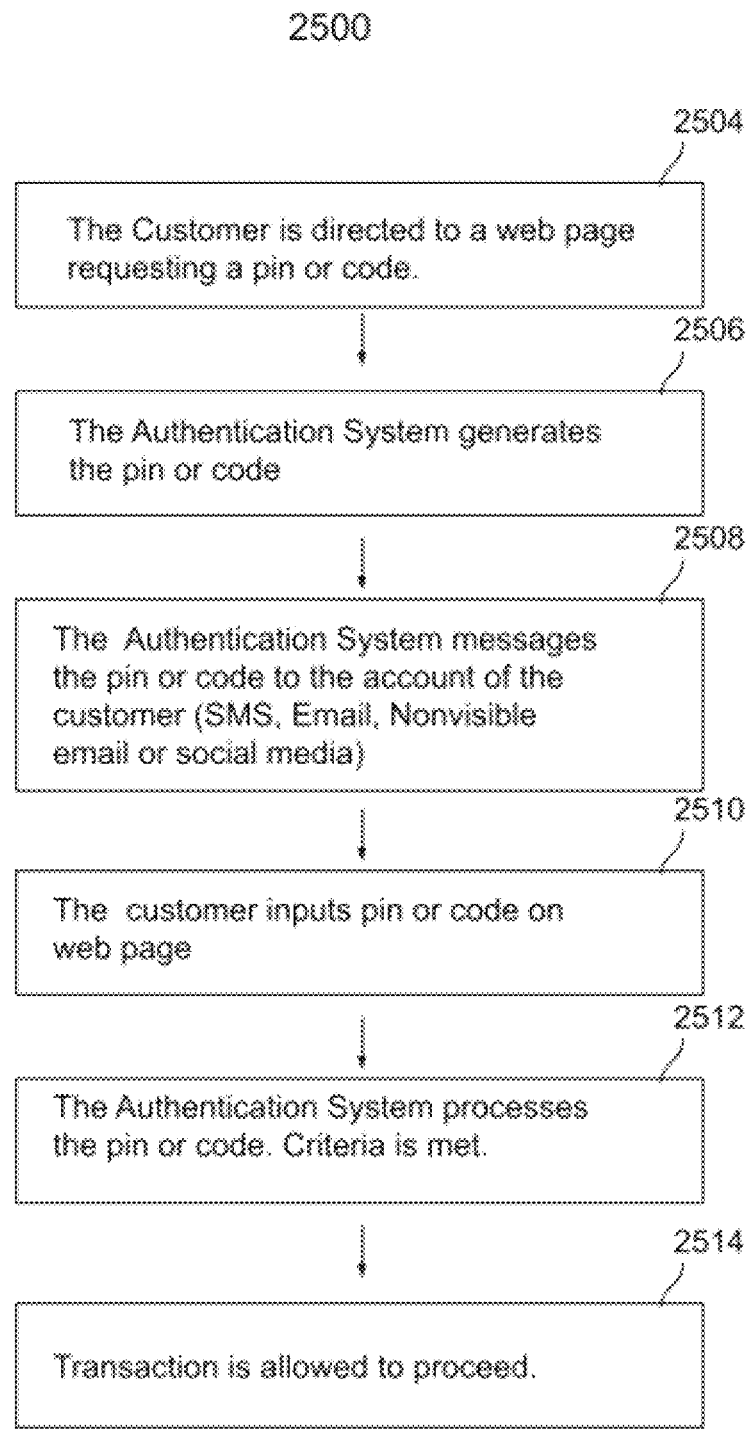
FIG. 25 is a process map illustrating an embodiment that utilizes MFA.

Alternatively or additionally, the authentication system 140 may request a second factor of authentication such as SMS, email, nonvisible email, or a social media message. FIG. 25 describes an additional factor of authentication for an Email-Based Oauth that may be inserted into the sequence. The customer using the customer device 150 is directed to an e-commerce system web page requesting a pin or code at step 2504. It may instruct the customer to check a specific account, such as an SMS account or email account. The e-commerce system generates the pin or code at step 2506. The authentication system 140 messages the pin or code to the account of the Customer (SMS, Email, Nonvisible email, or social media) at step 2508. The customer inputs a pin or code on a web page at step 2510. Alternatively, the customer may not be required to rewrite the pin or code but instead input a secret pin only known to the customer or alternatively select a link that will deliver the pin token or code to the Authentication system 140. The authentication system 140 processes the pin or code at step 2512. If the criteria are not met, the authentication system 140 may reject the transaction and redirect the user to signup or to repeat the process. If criteria are met, then the authentication system 140 allows the translation process to proceed at step 2514.

Figure 26:
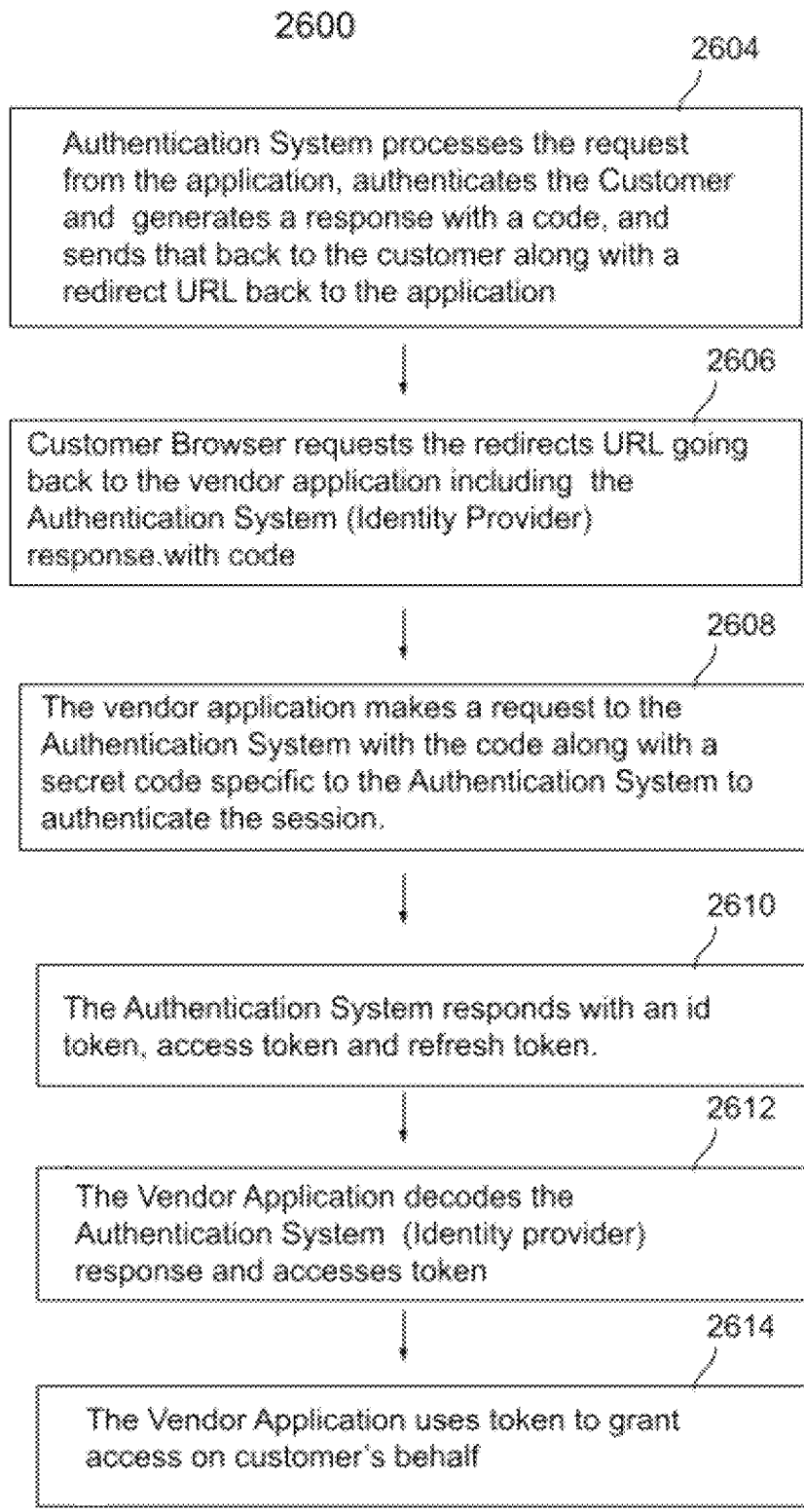
FIG. 26 is a process map illustrating an embodiment that utilizes Oauth.

FIG. 26 is a diagram illustrating an Email-Based OAuth for single-click authentication. FIG. 26 continues the process as described in FIG. 24 and may not require the steps described FIG. 25. The authentication system 140 processes the request from the application, authenticates the customer and generates a response with a code, and sends that back to the customer device along with a redirect URL back to the application at step 2604. The customer browser requests the redirect URL going back to the vendor system application, including the authentication system 140 (Identity Provider) response with code at step 2606. The vendor system application makes a request to the Authentication system 140 with the code along with a secret code specific to the authentication system 140 to authenticate the session at step 2608. The authentication system 140 application responds with an id token, access token, and refresh token at step 2610. The vendor system application decodes the authentication system 140 (Identity provider) response and accesses the token at step 2612. The vendor system application uses a token to grant access on the customer's behalf at step 2614.

Figure 27:
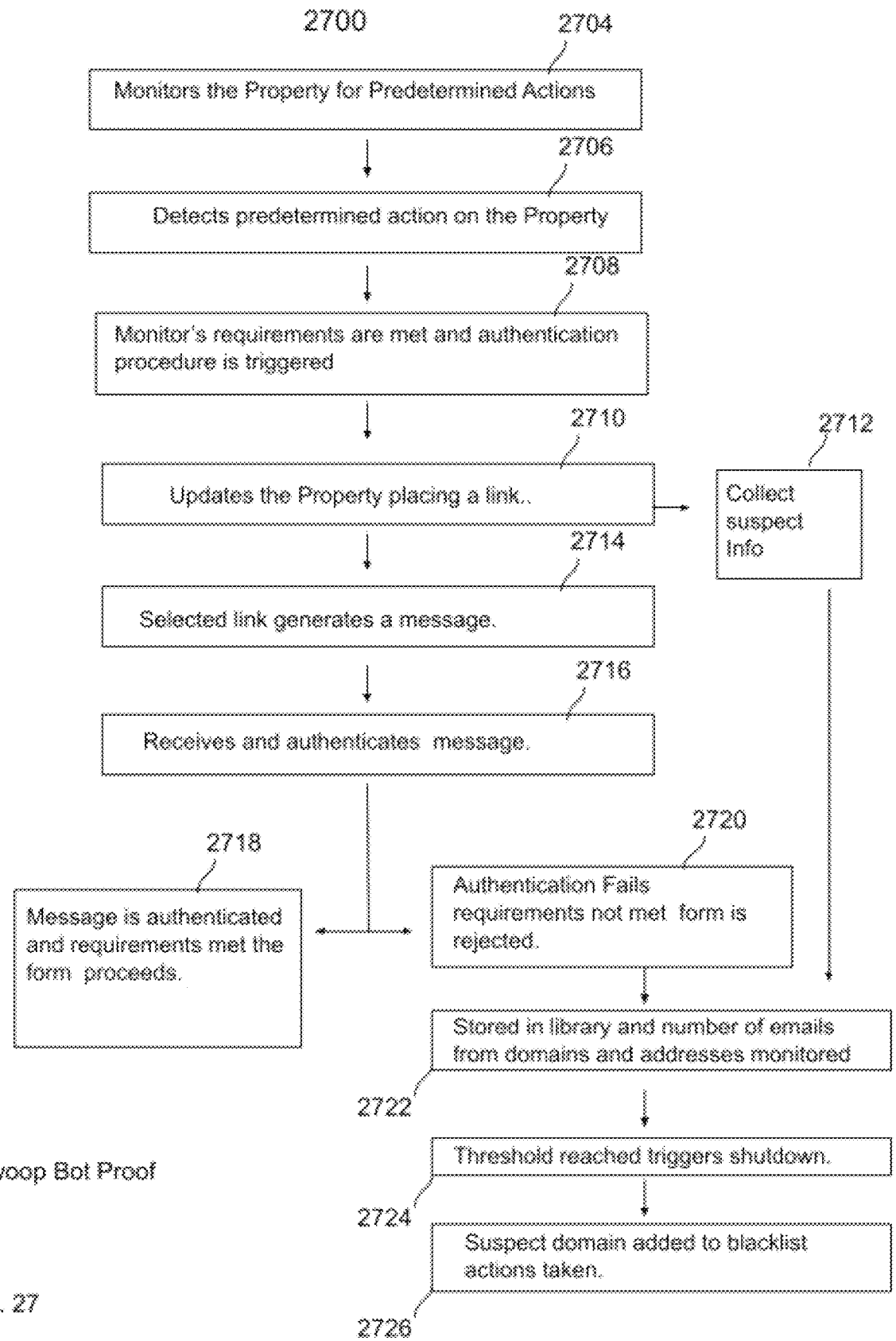
FIG. 27 is a process map illustrating an embodiment that detects malicious activity.

FIG. 27 is a diagram illustrating a form (property) submittal protection system. In some instances, an authentication system 140 may provide a service to a vendor for increased security on their system properties that utilize email-based authentication. The disclosed invention provides the vendor the ability to monitor their online systems and to react to fraudulent activity in an automated fashion. Properties on the vendor system that might be targeted by attackers are monitored by the authentication system 140. The vendor, customer, or authentication system 140 may define triggers based on activity on those properties. When the defined requirements are met, the authentication system 140 triggers preventative responses. A vendor, customer, or authentication system 140 may set these criteria on an application or on a web interface such as a web-based dashboard or mobile app. These may also be determined by the security module 162 of the Authentication system 140 without the input of the vendor or customer. Criteria may be defined by one characteristic or multiple factors. For example, an alert might be triggered based on a number of submissions over a defined period of time. Other possible triggers may be based on time of day or location. Another example is a number of attempts at inputting a password hash. The authentication system 140 monitors the actions taken on the vendor's property. In certain embodiments, when the defined trigger requirement is met, the security module 162 of the Authentication system 140 deploys a series of new requirements. The authentication system 140 may also collect device information and the IP address of the suspect user. One additional requirement may be a link or mailto link placed on the targeted property. The customer using the customer device accesses the mailto link on the property. The mailto link may be accessed multiple ways, such as in a message or on a webpage, or in an electronic document. The mailto link may be generated with at least one identifier. The mailto link may be a URL link that is capable of generating an email. A message is generated from the mailto link with the message addressed to the authentication system 140. The customer is required to select the link, generate an email message and send the email. The user may be required to make an alteration to the content of the email. For example, they may need to answer a security question or interact with the email content in a defined manner. The email may have a token. The token may be anywhere in the email. The customer shares the message with the authentication system 140. Various forms of authentication may be used, such as SPF, DKIM, and DMARC. Authentication may only be based on the encrypted key of the email message or may require decoding the token or processing the customer's alteration of the email content or some combination of all of these. The authentication system 140 may take various actions based on the outcome of the authentication process. The authentication system 140 may perform a lookup of the customer's account using the identifier and or email address. The authentication system 140 may not require any identifier. If the message is authenticated and requirements are met, the authentication system 140 will allow the process to proceed. This may include allowing a form to be submitted, payment processing, pledge secure access to a server, among others.

The Authentication system 140 monitors the email addresses which are authenticated and maintains a record. The vendor, customer, or authentication system 140 can define triggers based on email activity. When the required defined triggers are met, the authentication system 140 triggers preventative responses. A vendor, customer, or authentication system 140 may set these criteria on an application or on a web interface. These may also be determined by the authentication system 140 without the input of the vendor or customer. Criteria may be defined by one characteristic or multiple factors. For example, a trigger requirement might be set at a defined number of emails from the same domain within a defined period of time. When the defined number of emails from a single domain are received within the determined period of time, the Authentication system 140 may trigger a response. One response would be to shut down the web page or form in an automated fashion and notify the administrators. Other responses would be to add the email address and domains to a 'black list' of designated bad actors maintained and used by the authentication system 140. Another response might be to monitor the veracity of the attack and to respond to an attack against the identified accounts. The intensity response attack might be based on the metric produced on the original attack as a way of managing and de-escalating the conflict. Other tactics are to create decoy pages or to repurpose the targeted page and allow the attacker to expend resources on a page that is no longer used by the legitimate customer base. In this decoy or "straw man" tactic, the pages are used to gather data on users that engage in activities that might threaten legitimate vendors. In this scenario, the authentication system 140 automatically supplies the vendor system with new properties equivalent to the properties used before the attack began. One example of a property might be a signup form; however, it should be understood that any online property susceptible to cyber-attacks could be substituted.

The authentication system 140 monitors the property for predetermined actions at step 2704. The monitor may be a function of the security module 162. The monitor detects the predetermined action on the property of the vendor at step 2706. The monitor's requirements are met, and the authentication procedure is triggered at 2708. The authentication system 140 updates the property and places a link that generates a message at step 2710.

Alternatively or additionally, the authentication system 140 may collect information on the suspect user at step 2712. For example, the authentication system 140 may collect the IP address or device information. This information may be added to the library of step 2722 for cross-referencing The message is an email message but may be another format of the message, for example, an SMS or social media post. When the link is selected, it generates an email message on the customer's device that requires the customer to send the message at step 2714. The authentication system 140 receives and authenticates the email message at step 2716.

As described above, various forms of authentication may be used, such as SPF, DKIM, and DMARC. Authentication may be limited to DKIM, DMARC, or SPF path-based authentication. The authentication system 140 authenticates the customer's email using the digital signature. The authentication system 140 may take one or more actions based on the outcome of the authentication process. The authentication system 140 may perform a lookup of the customer's account using the identifier and or email address. The authentication system 140 may not require any identifier. If the customer is not authenticated or is missing information, or does not have an account, the customer may be navigated to a signup page for registration with the vendor and the authentication system 140.

If the message is authenticated and requirements are met, the property submittal is allowed to proceed at step 2718. Authentication may fail and or requirements may not be met; the property submittal is rejected at step 2720. If authentication fails, the received emails address and domain may be stored in a library, and the number of emails from domains and addresses monitored at step 2722. Received messages reach threshold monitor triggers a form shut down at step 2724. Suspect domain added to library or 'blacklist,' system administrators may be contacted and properties replaced with alternate versions at step 2726.

The authentication system 140 may couple together with a series of monitors on various different vendor sites to create a wider surveillance resource that monitors fraudulent behavior throughout the internet. In addition, in some instances, the authentication system 140 utilizes machine learning to enhance the security of the process. In addition to storing cookies on a customer device to identify the customer, the authentication system 140 collects information about the customer, including but not limited to IP Address, browser, and OS, to create a unique fingerprint for the customer. This fingerprint will reinforce the validity of cookies on the customer's device as well as provide a mechanism for identifying the customer in the event that they clear their browser cache.

Culminating in the above referenced 'black list' of suspicious email addresses, domains, device information, and IP addresses. This identifying information then may be supplied back to the community of vendors and customers to use as a filter to automatically respond with a rejection when those bad actors engage their properties. Additionally, this community of vendors allows for a system for a coordinated counterattack.

Figure 28:
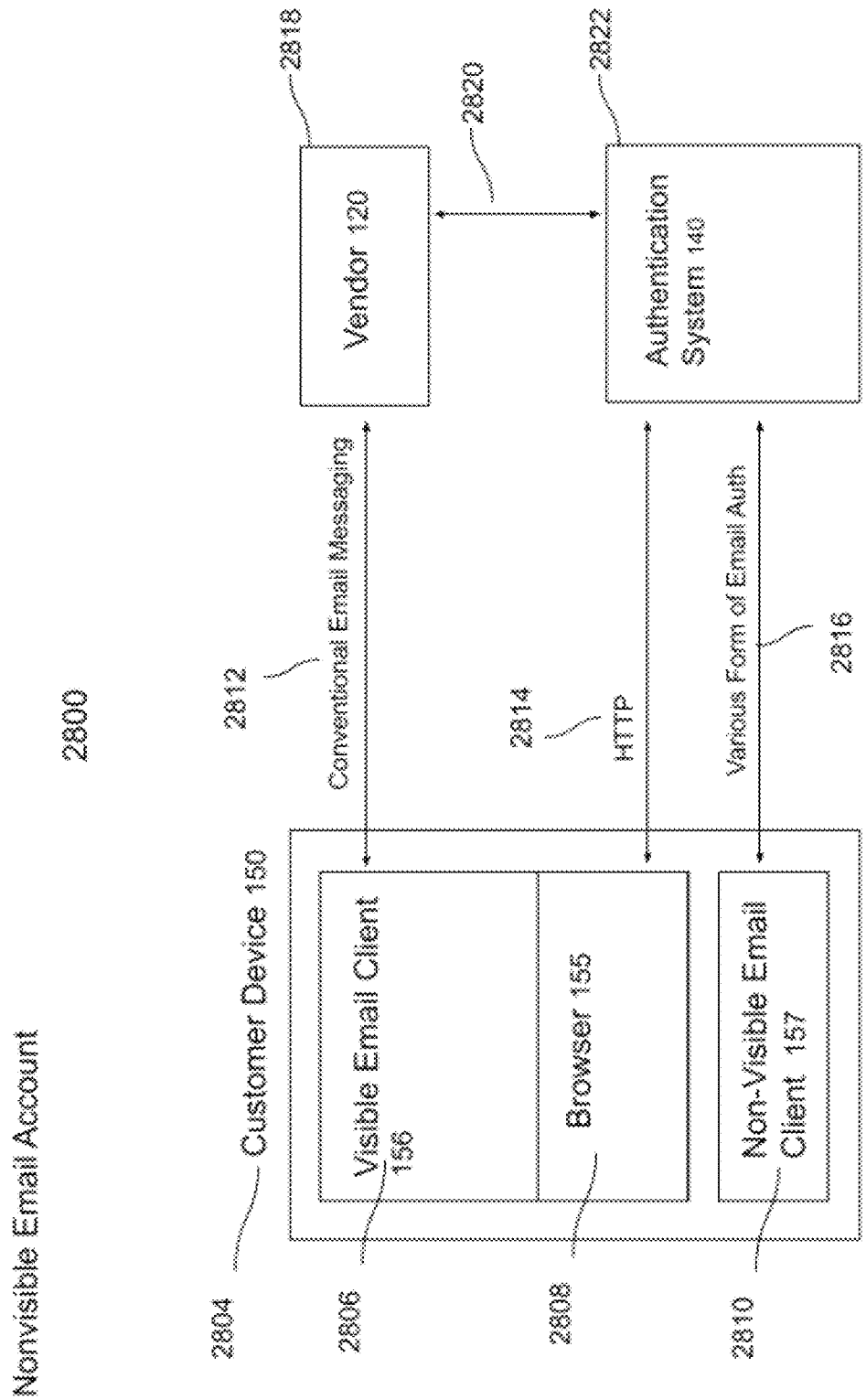
FIG. 28 is a transactional flow diagram illustrating an embodiment that utilizes a non-visible email account.

FIG. 28 is a diagram 2800 that illustrates a nonvisible email client for email-based authentication. The nonvisible email application does not require the customer to respond, open the email message or select links or send a message. This nonvisible email account may not require a conventional email client, and it may send and receive emails programmatically. This may be accomplished by the application programming interface. The disclosed nonvisible email format does not require human-readable attributes, so the format of the messages may be designed for automated processing. SMTP messages are sent and received between the customer device and the Authentication system 140. The nonvisible email account may monitor incoming emails and automatically activate links in the content of the emails. The Return-Path address, Header, and the Body of the email format may be reconfigured for increased security. For example, additional code or tokens may be added to the content of the Return-Path address, Header, and the Body that requires decoding when received. This code or the tokens may be encrypted. This code and or token may be interdependent. Multiple email messages may be required with the corresponding Return-Path address, Header, and the Body.

The customer device 150 may have a conventional email client 156 and browser 155, where the customer may access the vendor system at step 2812. The customer device may be equipped with a nonvisible email client application 157. This function may be integrated into the browser or the email client. The authentication system 140 authenticates the messages of the customer using the nonvisible email account at step 2816. This may require a token. The authentication system 140 communicates the results of the authentication process to the vendor or third-party system at step 2814. Alternatively or additionally, the authentication system 140 may send and or receive email messages with the nonvisible email account with a link and token at step 2814. The nonvisible email account on the customer device may access the link in the message. This link, when triggered, may generate a response email that is automatically sent back to the authentication system 140 via SMTP and authenticated. Alternatively, or additionally, this link may share the token or code to the authentication system 140 by HTTP, and the authentication system 140 authenticates the customer at step 2814. If authentication is successful and requirements are met, the authentication system 140 may notify the vendor or third party at step 2820. This allows the vendor or third-party system to make a secure transaction or grant secure access on behalf of the customer.

This nonvisible email account may be designed only to respond to emails from and to certain domains or addresses. The nonvisible email account may only respond if the customer is logged into their account and or if they are logged into the customer's device. The nonvisible email account may also be integrated into or programmatically connected to a conventional email client. The conventional email client may be designed to perform both visible and nonvisible messaging functions but masks the nonvisible emails from the customer experience. One way this may be done is by categorizing any emails from the designated email address that appear in the to, cc, bcc, and or from fields. The emails which are categorized under the nonvisible category are not displayed on the customer device interface. The category may be based on domain names or the 'local names' portion of the email address. The nonvisible email account may be accessed with the same security as the conventional email client.

The nonvisible email account may also require a series of emails in a specific order with a specific email address to maintain security. For example, user+1@email.com may have to be followed by user+2@email.com, which needs to be followed by user+3@email.com. In this example, the customer device's nonviable account generates the email address and maintains the proper order in an automated fashion. The authentication system 140 monitors the incoming emails for the proper order. This process is reversed by having the authentication system 140 assign emails with the order and having the customer device's nonvisible email account monitor and regulate the incoming emails for the proper order. Alternatively, or additional consecutive order may be maintained by both the authentication system 140 and the nonvisible email account. If this order is interrupted, the authentication system 140 or the nonvisible email account may reject the authentication. Furthermore, if the proper order is maintained, the authentication may be designated OK and allowed to proceed. Although in this example, the additional numerals to the email address increase by single digits, this format may vary. The variation might be a predetermined set of codes or based on time or location. The email order, authentication, email encryption, or authentication tokens may be secured by blockchain.

Figure 29:
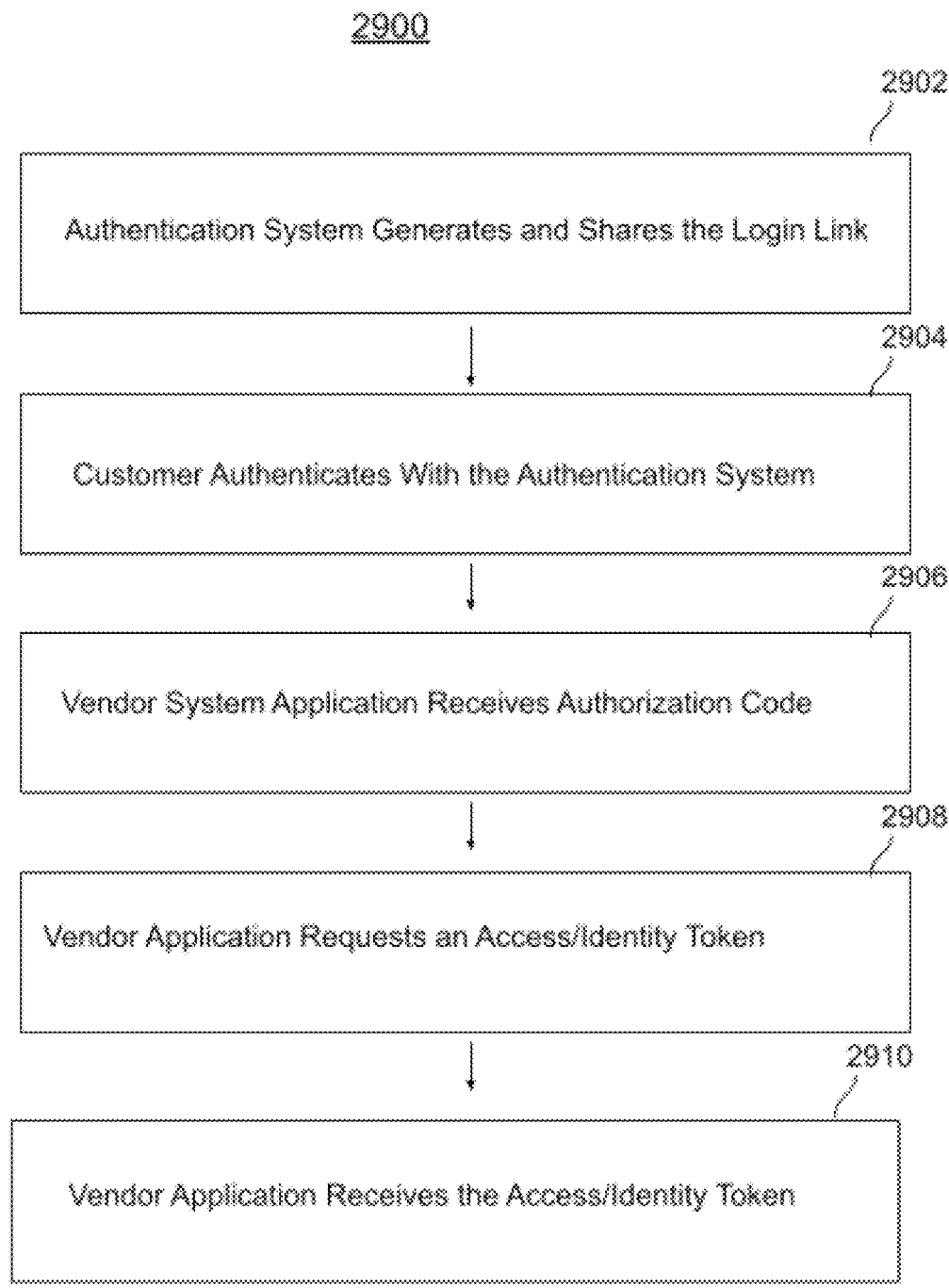
FIG. 29 is a process map illustrating an embodiment that utilizes Oauth.

FIG. 29 illustrates a process map for a process 2900 where the authentication system 140 offers vendors or third parties a way to easily add the email based authentication service to a website and begin authenticating customers via an email-based OAuth.

In step 2902, the authentication system 140 generates the Authentication Login Link and sends the Authentication Login link the customer to authorize. The following is an example of an Authentication Login Link:
https://auth.swoop.email/oauth2/authorize?response_type=code&redirect_uri=REDIRECT_URI&scope=email&state=&client_id=CLIENT_ID In some instances, the Authentication system 140 sets a series of parameters for the Authentication Login Link. For example, a variable such as "client_id" with a value being "swoop_" and is described as the Authentication system 140 client ID. A variable such as "redirect_uri" with a value being "http:myuserapp.com/callback" and is described as the url that the Authentication system 140 will redirect to when the authorization code is granted. The value passed is required to match the vendor specified when setting up the property. A variable such as "scope" with a value being "email" and is described as only allowing the sharing of a customer's email via email-based OAUTH. This tells the Authentication system 140 that the calling application is requesting the customer's email. A variable such as "state" with a value being "login/register/ect.". and is described as any value the vendor application wants to pass the Authentication system 140. When the access token has been granted the value of this variable will be passed back to the vendor system 120. A variable such as "response_type" with a value being "code" and is described as specifying the vendor system 120 is requesting an authorization code grant from the Authentication system 140**.

Next in step 2904, the Customer Authenticates With the Authentication system 140. Once the customer redirects to the Authentication system 140, the customer can authenticate in multiple ways as described herein. If the user has authenticated with the Authentication system 140 before, they are able to use the 1-Click Quick Login to bypass email verification.

Then in step 2906, the vendor system 120 receives an Authorization Code Once when the customer authenticates with Authentication system 140. In many instances, the Authentication system 140 will redirect the browser to the REDIRECT_URL that the vendor system passed in on the URL. The URL will contain a parameter named code in the query parameters. An example URL might look like this:

https://myuserapp.com/
callback?code=AUTHORIZATION CODE

In step 2908, the Vendor System 120 requests an Access Token. For example, once the customer redirects to the Vendor System application's REDIRECT_URL, the vendor system application may make a POST request to the Authentication system 140 with the code along with the Vendor System property's secret to obtain the access token.

Below is an example of a POST request that may be implemented.

```
curl --header "Content-Type: application/json" \
--request POST \
--data '{"redirect_uri":"REDIRECT_URI","code":"718xzc4k87fqcl7",
"client_id" : "CLIENT_ID", "client_secret": "CLIENT_SECRET"}' \
https://auth.swoop.email/oauth2/token
```

Then in step 2910 Application Receives the Access/ Identity Token Swoop will return a response containing a JWT or JSON web token can access/identify token for your user. An example JSON message may be as follows:

```
{
  access_token:
'eyJhbGciOiJSUzI1NiIsInR5cCI6IkpXVCIsImtpZCI6InN3b29wIn0.eyJzdWIiOiI1ZT
FmNzk1YTYxMzgxYzJhZDcwYTg3MjciLCJpYXQiOjE1ODUyNTU1MzUsImV4cCI
6MTU4NTI1NTUzNn0.JlqMw3h4nH5mOJUmFNxIW2lxdUDbH0bzw5kmv1zxISF
UAYEapzp6SrkY_7szBTQ_pHE6oEuIFKfmJ6KDPFFULiQOczhDIUdGKz_aRUL91
_sMJUHPZ90m5dTksh7pGx0mE6lFlCSwahbAJ1UsT5X29gjtIC8GMPPt2HA8vBL0
gVLM3MY5SX91A9MJFQeMNob95Z5QSO2ElYpBkA7NBqrSVvO40TiYzpYxFNuA
JnCh-
sBlwBWSGz3ddN_bdb3FeILMngzy0knc205JCa15P1FJmimlFe6JDijo29RsyijBzmQ
Z0ZaVRH-GuUojhLPs4JPj9K25ouOr2pU5-UTk_1kNYg',
  id_token:
'eyJhbGciOiJSUzI1NiIsInR5cCI6IkpXVCIsImtpZCI6InN3b29wIn0.eyJpc3MiOiJod
HRwczovL2F1dGguc3dvb3AuZW1haWwiLCJzdWIiOiI1ZTFmNzk1NjYxM2ExYzJh
ZDcwYTg3MjgiLCJhdWQiOiJzd29vcF9wZGtocTRrODdnZDc1cCIsIm5vbmNlIjoiU1
9sc3ZzYTg5c2ciLCJlbWFpbCI6ImRlbW9Ac3dvb3AuZW1haWwiLCJpYXQiOjE1OD
UyNTU1MzUsImV4cCI6MTU4NjExOTUzNX0.d9_qKkHzDQs6YYYwz4YFN8gpvQ
ebuFhkfm1zLIuYlzqmk85tUD0YGUskinWaSsjiB53r8DhTBb9iKAVc969xcVdDOD7
BBGTtm2NJhgq0WVRF5Xj4YjlsYOAIbPxA8IUYa5NWKzWSfw4r-
oen9LxvTE4T4BPBdm_XxGfUpO_r-cX4APqhaplwhGmS9wfd-
mqelWW3CkWItqReNLOudEHDHuxQVm2gYzbx-
bw9CAu_PUxXvpR4y_SjfW9YtPOAtOkY2O5sOq0ItTsPxvHLoQ8GfjDXMARqGSMf
f4u2LHOoKzlNxW_fOkkEKPh5upchvtmfMvptnS-u-SAyKR5GwUqvXQ',
  refresh_token:
'eyJhbGciOiJSUzI1NiIsInR5cCI6IkpXVCIsImtpZCI6InN3b29wIn0.eyJzdWIiOiI1ZT
FmNzk1MTYxMzgyYzJhZDcwYTg3MjkiLCJpYXQiOjE1ODUyNTU2NTYsImV4cCI
6MTU4NTI1NTY1N30.ls6Hcsii2IxZ91uZGVKpTvb1V7EMv720-
K6VTg3yscojyNX0U_Idl7g1UJMOvTBI45rWNt5TTi4WgJ075Fc_B_qlfemqyqp6cYF
FA4vQa4u9v7FoYfuB55e4nKrrX-Da-
ZjAXGEMCxGSqxzfL6wt6S0czWOA16TAaoqbIWUW92eg2wEOslg7UFt0DoQ9xm1
F7GY93fueXb5x_jJgSgtCMe9BqVyUArxyat0fRJS--j3_xK_PX27ancUR-
x9KMKBjRw1WOCaA9T5VcwF16wBkPEqadtAIS4sCeBfXTdneCTFdaGEe2EOZpB
NWcym-_6ZIKhPooG1Fub9yaBNWIRZQ5A'
  token_type: 'bearer',
  expires_in: 3600
}
```

In some instances, the Oath token may be used to allow the customer to access websites that are hosted by different companies that utilize the same authentication server 140. For example, the customer may authenticate once to the authentication server 140 and then be able to access website A, website B and website C without requiring a further login or by using the 1 click login described herein. In some instances, the customer may be able to configure which websites are to be linked to the authentication. For example, the customer may want to only authenticate to websites A and C but not B. As a result, in some instances, the user can configure which websites to link to the authentication by using either an app that is downloaded to the customers device 150 or by accessing a configuration web page that is hosted by the authentication server 140.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general-purpose computer or a processor. Examples of non-transitory computer-readable storage mediums include a read-only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for improving security of a computer network by utilizing Simple Mail Transfer Protocol (SMTP), the method comprising:
   receiving, via SMTP, a message that requests authentication of a user from a customer device, wherein the message contains a token;
   authenticating a sender of the message utilizing at least one DomainKeys Identified Mail (DKIM), Domain-based Message Authentication, Reporting & Conformance (DMARC), and/or Sender Policy Framework (SPF) protocols;
   decoding the token contain in the message to form a decoded token;
   conditionally performing additional security checks on the message based on the decoded token, wherein the additional security checks are performed when the decoded token indicates that the message was generated via a copy and paste routine; and
   authenticating the user when the sender of the message is authenticated and the additional security checks are successful.

2. The method of claim 1, wherein the authenticating the user grants the user access to a secure webpage.

3. The method of claim 1, wherein the additional security checks include performing a multi-factor authentication.

4. The method of claim 1, wherein authenticating the user generates an Oauth token.

5. The method of claim 4, wherein the Oauth token grants the user access to webpages hosted by a plurality of third parties.

6. A system for improving security of a computer network utilizing Simple Mail Transfer Protocol (SMTP), the system comprising:
   a memory;
   a communication interface that is communicatively coupled to a client device via network; and
   a processor that is communicatively coupled to the memory and the communication interface,
   wherein the processor is configured to:
   receive, using the communication interface, a message that requests authentication of a user from a customer device via SMTP, wherein the message contains a token;
   authenticate a sender of the message utilizing at least one DomainKeys Identified Mail (DKIM), Domain-based Message Authentication, Reporting & Conformance (DMARC), and/or Sender Policy Framework (SPF) protocols;
   decode the token contain in the message to form a decoded token;
   conditionally perform additional security checks on the message based on the decoded token, wherein the additional security checks are performed when the decoded token indicates that the message was generated via a copy and paste routine; and
   authenticate the user when the sender of the message is authenticated and the additional security checks are successful.

7. The system of claim 6, wherein the user is granted access to a secure webpage when the user is authenticated.

8. The system of claim 6, wherein the additional security checks include performing a multi-factor authentication.

9. The system of claim 6, wherein an Oauth token is generated when the user is authenticated.

10. The system of claim 9, wherein the Oauth token grants the user access to webpages hosted by a plurality of third parties.

11. A non-transitory computer readable storage medium that stores instructions for improving security of a computer networking by utilizing Simple Mail Transfer protocol, wherein the instructions when executed by a processor, cause the processor to execute a method, the method comprising:
   receiving, via SMTP, a message that requests authentication of a user from a customer device, wherein the message contains a token;
   authenticating a sender of the message utilizing at least one DomainKeys Identified Mail (DKIM), Domain-based Message Authentication, Reporting & Conformance (DMARC), and/or Sender Policy Framework (SPF) protocols;
   decoding the token contain in the message to form a decoded token;
   conditionally performing additional security checks on the message based on the decoded token, wherein the additional security checks are performed when the decoded token indicates that the message was generated via a copy and paste routine; and
   authenticating the user when the sender of the message is authenticated and the additional security checks are successful.

12. The non-transitory computer readable storage medium of claim 11, wherein the authenticating the user grants the user access to a secure webpage.

13. The non-transitory computer readable storage medium of claim 11, wherein the additional security checks include performing a multi-factor authentication.

14. The non-transitory computer readable storage medium of claim 11, wherein authenticating the user generates an Oauth token.

15. The non-transitory computer readable storage medium of claim 14, wherein the Oauth token grants the user access to webpages hosted by a plurality of third parties.

* * * * *